US010733639B2

(12) United States Patent
Swinson et al.

(10) Patent No.: US 10,733,639 B2
(45) Date of Patent: *Aug. 4, 2020

(54) SYSTEM AND METHOD FOR ANALYSIS AND PRESENTATION OF USED VEHICLE PRICING DATA

(71) Applicant: TrueCar, Inc., Santa Monica, CA (US)

(72) Inventors: Michael D. Swinson, Santa Monica, CA (US); Isaac Lemon Laughlin, Los Angeles, CA (US); Meghashyam Grama Ramanuja, Santa Monica, CA (US); Mikhail Semeniuk, Golden Valley, MN (US); Xingchu Liu, Austin, TX (US)

(73) Assignee: TrueCar, Inc., Santa Monica, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 16/148,695

(22) Filed: Oct. 1, 2018

(65) Prior Publication Data

US 2019/0034983 A1     Jan. 31, 2019

Related U.S. Application Data

(63) Continuation of application No. 14/145,252, filed on Dec. 31, 2013, now Pat. No. 10,108,989, which is a (Continued)

(51) Int. Cl.
    *G06Q 30/02*         (2012.01)
    *G06Q 10/06*         (2012.01)

(52) U.S. Cl.
    CPC ......... *G06Q 30/0278* (2013.01); *G06Q 10/06* (2013.01); *G06Q 30/02* (2013.01); *G06Q 30/0206* (2013.01)

(58) Field of Classification Search
None
See application file for complete search history.

(56) References Cited

U.S. PATENT DOCUMENTS 5,361,201 A    11/1994   Jost
5,377,095 A    12/1994   Maeda et al.
(Continued)

FOREIGN PATENT DOCUMENTS

CN             1501301 A       6/2004
CN             1734492 A       2/2006
(Continued)

OTHER PUBLICATIONS

Office Action issued for U.S. Appl. No. 14/031,930, dated May 30, 2019, 26 pages.
(Continued)

*Primary Examiner* — Mehmet Yesildag
(74) *Attorney, Agent, or Firm* — Sprinkle IP Law Group

(57) ABSTRACT

To increase the efficiency of a used vehicle data processing process while still tailoring to an individual user's unique specifications on a used vehicle, at least some pre-calculations are performed by a backend process before a request for data for a specified vehicle is received through a web site or a web server on the Internet. A user can be presented with an interface where the user can make a variety of determinations. After the user requests data on a specific vehicle configuration, a frontend process handles user-provided data in conjunction with the data calculated in the backend process to ensure that the results are better tailored to the user's specific vehicle attributes. The results can include pricing data such as a trade-in price, a list price, an expected sale price or range of sale prices, market low sale price, market average sale price, market high sale price, etc.

20 Claims, 7 Drawing Sheets

Related U.S. Application Data continuation of application No. 13/554,743, filed on Jul. 20, 2012, now Pat. No. 8,645,193.

(60) Provisional application No. 61/512,787, filed on Jul. 28, 2011.

(56) References Cited

U.S. PATENT DOCUMENTS

| | | |
|---|---|---|
| 5,774,873 A | 6/1998 | Berent et al. |
| 6,006,201 A | 12/1999 | Berent et al. |
| 6,029,141 A | 2/2000 | Bezos et al. |
| 6,125,356 A | 9/2000 | Brockman et al. |
| 6,282,517 B1 | 8/2001 | Wolfe et al. |
| 6,298,328 B1 | 10/2001 | Healy et al. |
| 6,330,499 B1 | 12/2001 | Chou et al. |
| 2,002,856 A1 | 8/2002 | Messer et al. |
| 6,604,083 B1 | 8/2003 | Bailey |
| 6,609,108 B1 | 8/2003 | Pulliam et al. |
| 6,882,983 B2 | 4/2005 | Furphy et al. |
| 6,892,185 B1 | 5/2005 | Van Etten et al. |
| 6,895,388 B1 | 5/2005 | Smith |
| 6,975,999 B2 | 12/2005 | Moore |
| 7,050,982 B2 | 5/2006 | Sheinson |
| 7,113,090 B1 | 9/2006 | Saylor |
| 7,133,835 B1 | 11/2006 | Fusz et al. |
| 7,184,974 B2 | 2/2007 | Shishido |
| 7,219,080 B1 | 5/2007 | Wagoner et al. |
| 7,287,000 B2 | 10/2007 | Boyd et al. |
| 7,366,679 B2 | 4/2008 | Yuyama et al. |
| 7,392,224 B1 | 6/2008 | Bauer et al. |
| 7,546,243 B2 | 6/2009 | Kapadia et al. |
| 7,596,501 B2 | 9/2009 | Tivey et al. |
| 7,596,512 B1 | 9/2009 | Raines et al. |
| 7,599,842 B2 | 10/2009 | Tivey et al. |
| 7,624,065 B2 | 11/2009 | Schoen et al. |
| 7,747,474 B2 | 6/2010 | Miloslavsky et al. |
| 7,778,841 B1 | 8/2010 | Bayer et al. |
| 7,801,798 B1 | 9/2010 | Huemer et al. |
| 7,818,201 B2 | 10/2010 | Shevlin et al. |
| 7,835,982 B2 | 11/2010 | Schoen et al. |
| 7,921,052 B2 | 4/2011 | Dabney et al. |
| 7,945,483 B2 | 5/2011 | Inghelbrecht et al. |
| 7,970,713 B1 | 6/2011 | Gorelik et al. |
| 8,000,989 B1 | 8/2011 | Kiefhaber et al. |
| 8,005,684 B1 | 8/2011 | Cheng et al. |
| 8,036,952 B2 | 10/2011 | Mohr et al. |
| 8,078,515 B2 | 12/2011 | John |
| 8,095,422 B2 | 1/2012 | Hallowell et al. |
| 8,108,262 B1 | 1/2012 | Thirumalai et al. |
| 8,112,325 B2 | 2/2012 | Foy et al. |
| 8,126,881 B1 | 2/2012 | Sethi et al. |
| 8,219,464 B2 | 7/2012 | Inghelbrecht et al. |
| 8,230,362 B2 | 7/2012 | Couch |
| 8,255,270 B2 | 8/2012 | Rose et al. |
| 8,326,845 B2 | 12/2012 | Sethi et al. |
| 8,375,037 B2 | 2/2013 | Sethi et al. |
| 8,392,264 B2 | 3/2013 | Doll |
| 8,429,220 B2 | 4/2013 | Wilkinson et al. |
| 8,515,817 B2 | 8/2013 | Noy et al. |
| 8,521,615 B2 | 8/2013 | Inghelbrecht et al. |
| 8,521,619 B2 | 8/2013 | Perry, III et al. |
| 8,538,828 B2 | 9/2013 | Skutta |
| 8,589,212 B2 | 11/2013 | Pollak et al. |
| 8,595,082 B2 | 11/2013 | Skutta |
| 8,612,314 B2 | 12/2013 | Swinson |
| 8,645,193 B2 | 2/2014 | Swinson et al. |
| 8,676,799 B1 | 3/2014 | Vaver |
| 8,818,881 B2 | 8/2014 | Himmerick et al. |
| 8,868,572 B2 | 10/2014 | Sethi et al. |
| 9,020,843 B2 | 4/2015 | Taira et al. |
| 9,020,844 B2 | 4/2015 | Taira et al. |
| 9,103,743 B2 | 8/2015 | Couch |
| 9,104,718 B1 | 8/2015 | Levy et al. |
| 9,111,308 B2 | 8/2015 | Taira et al. |
| 9,129,325 B2 | 9/2015 | Taira et al. |
| 9,189,960 B2 | 11/2015 | Couch et al. |
| 9,324,104 B1 | 4/2016 | Levy et al. |
| 9,347,758 B2 | 5/2016 | Berent et al. |
| D765,089 S | 8/2016 | Agee |
| 9,412,203 B1 | 8/2016 | Garcia, III et al. |
| 9,465,873 B1 | 10/2016 | Franke et al. |
| 9,466,079 B2 | 10/2016 | Hygema et al. |
| D774,523 S | 12/2016 | Agee |
| D774,524 S | 12/2016 | Agee |
| 9,600,822 B2 | 3/2017 | Pyle et al. |
| 9,727,904 B2 | 8/2017 | Inghelbrecht et al. |
| 9,754,304 B2 | 9/2017 | Taira et al. |
| 9,767,491 B2 | 9/2017 | Swinson et al. |
| 9,818,140 B2 | 11/2017 | Inghelbrecht et al. |
| 9,904,933 B2 | 2/2018 | Taira et al. |
| 9,904,948 B2 | 2/2018 | Taira et al. |
| 1,010,898 A1 | 10/2018 | Swinson et al. |
| 1,021,712 A1 | 2/2019 | Taira et al. |
| 1,026,234 A1 | 4/2019 | Swinson et al. |
| 1,026,903 A1 | 4/2019 | Taira et al. |
| 1,029,693 A1 | 5/2019 | Swinson et al. |
| 10,489,809 B2 | 11/2019 | Inghelbrecht et al. |
| 10,489,810 B2 | 11/2019 | Taira et al. |
| 10,504,159 B2 | 12/2019 | Laughlin et al. |
| 10,515,382 B2 | 12/2019 | Taira et al. |
| 10,679,263 B2 | 6/2020 | Swinson et al. |
| 2001/0037205 A1 | 11/2001 | Joao |
| 2001/0037265 A1 | 11/2001 | Kleinberg |
| 2002/0007331 A1 | 1/2002 | Lo et al. |
| 2002/0116348 A1 | 8/2002 | Phillips et al. |
| 2002/0147625 A1 | 10/2002 | Kolke, Jr. |
| 2002/0194051 A1 | 12/2002 | Hall et al. |
| 2003/0028437 A1 | 2/2003 | Grant et al. |
| 2003/0065532 A1* | 4/2003 | Takaoka ............... G06Q 30/06 705/80 |
| 2003/0083961 A1 | 5/2003 | Bezos et al. |
| 2003/0105728 A1* | 6/2003 | Yano ................... G06Q 10/06 705/400 |
| 2003/0130966 A1 | 7/2003 | Thompson et al. |
| 2003/0200151 A1 | 10/2003 | Ellenson et al. |
| 2003/0220773 A1 | 11/2003 | Haas et al. |
| 2003/0229577 A1 | 12/2003 | Nabel |
| 2004/0014454 A1 | 1/2004 | Burgess |
| 2004/0019516 A1 | 1/2004 | Puskorius et al. |
| 2004/0093284 A1 | 5/2004 | Takaoka |
| 2004/0128224 A1 | 7/2004 | Dabney et al. |
| 2004/0143473 A1 | 7/2004 | Tivey et al. |
| 2004/0143476 A1 | 7/2004 | Kapadia et al. |
| 2004/0143482 A1 | 7/2004 | Tivey et al. |
| 2004/0172266 A1* | 9/2004 | Sheinson ............... G06Q 30/02 705/26.1 |
| 2004/0210485 A1 | 10/2004 | Luo et al. |
| 2004/0254808 A1 | 12/2004 | Bennett et al. |
| 2005/0071249 A1 | 3/2005 | Nix et al. |
| 2005/0086070 A1 | 4/2005 | Engelman |
| 2005/0108112 A1 | 5/2005 | Ellenson et al. |
| 2005/0125308 A1 | 6/2005 | Puentes et al. |
| 2005/0144061 A1 | 6/2005 | Rarity et al. |
| 2005/0171859 A1 | 8/2005 | Harrington et al. |
| 2005/0171896 A1 | 8/2005 | Seretti et al. |
| 2005/0197941 A1 | 9/2005 | Veit |
| 2005/0209934 A1 | 9/2005 | Irby et al. |
| 2005/0256778 A1 | 11/2005 | Boyd et al. |
| 2005/0256780 A1 | 11/2005 | Eldred |
| 2005/0261951 A1 | 11/2005 | Tighe |
| 2005/0266833 A1 | 12/2005 | Walker |
| 2005/0267774 A1 | 12/2005 | Merritt et al. |
| 2006/0080210 A1 | 4/2006 | Mourad et al. |
| 2006/0085209 A1 | 4/2006 | Walker, III |
| 2006/0085283 A1 | 4/2006 | Griffiths |
| 2006/0106668 A1 | 5/2006 | Kim et al. |
| 2006/0129423 A1 | 6/2006 | Sheinson et al. |
| 2006/0178973 A1 | 8/2006 | Chiovari et al. |
| 2006/0212355 A1 | 9/2006 | Teague et al. |
| 2006/0242089 A1 | 10/2006 | Vahidi et al. |
| 2007/0005446 A1 | 1/2007 | Fusz et al. |
| 2007/0038522 A1 | 2/2007 | Bell et al. |
| 2007/0112582 A1 | 5/2007 | Fenlon |
| 2007/0124284 A1 | 5/2007 | Lin et al. |

(56) References Cited

U.S. PATENT DOCUMENTS

| | | |
|---|---|---|
| 2007/0143132 A1 | 6/2007 | Linne et al. |
| 2007/0143195 A1 | 6/2007 | Bell et al. |
| 2007/0162293 A1 | 7/2007 | Malkon |
| 2007/0185777 A1 | 8/2007 | Pyle et al. |
| 2007/0219851 A1 | 9/2007 | Taddei et al. |
| 2007/0244797 A1 | 10/2007 | Hinson et al. |
| 2007/0250327 A1 | 10/2007 | Hedy |
| 2008/0027882 A1 | 1/2008 | Allen et al. |
| 2008/0046383 A1 | 2/2008 | Hirtenstein et al. |
| 2008/0052216 A1 | 2/2008 | Johnson et al. |
| 2008/0077477 A1 | 3/2008 | McElhiney et al. |
| 2008/0177590 A1 | 7/2008 | Brodsky et al. |
| 2008/0189156 A1 | 8/2008 | Voda et al. |
| 2008/0201163 A1 | 8/2008 | Barker et al. |
| 2008/0201203 A1 | 8/2008 | Rose et al. |
| 2008/0207191 A1 | 8/2008 | Fleenor et al. |
| 2008/0288312 A1 | 11/2008 | Miles et al. |
| 2008/0288361 A1 | 11/2008 | Rego et al. |
| 2008/0300962 A1 | 12/2008 | Cawston et al. |
| 2009/0006118 A1 | 1/2009 | Pollak |
| 2009/0037356 A1 | 2/2009 | Rothstein et al. |
| 2009/0048859 A1 | 2/2009 | McCarthy et al. |
| 2009/0157522 A1* | 6/2009 | Srinivasan ............ G06Q 30/00 705/26.1 |
| 2009/0171761 A1 | 7/2009 | Noy et al. |
| 2009/0187513 A1 | 7/2009 | Noy et al. |
| 2010/0070343 A1* | 3/2010 | Taira ................. G06Q 30/0609 705/400 |
| 2010/0070344 A1 | 3/2010 | Taira et al. |
| 2010/0070382 A1 | 3/2010 | Inghelbrecht et al. |
| 2010/0088158 A1* | 4/2010 | Pollack ................. G06Q 30/02 705/7.35 |
| 2010/0161376 A1 | 6/2010 | Spagnolo |
| 2010/0161408 A1 | 6/2010 | Karson et al. |
| 2010/0179861 A1 | 7/2010 | Teerilahti et al. |
| 2010/0191659 A1 | 7/2010 | Hebron |
| 2010/0198735 A1* | 8/2010 | Basak ................ G06Q 30/0278 705/306 |
| 2010/0274571 A1 | 10/2010 | McFall et al. |
| 2010/0274631 A1 | 10/2010 | McFall et al. |
| 2011/0022525 A1 | 1/2011 | Swinson et al. |
| 2011/0040697 A1 | 2/2011 | Constantinou et al. |
| 2011/0082720 A1 | 4/2011 | Swinson et al. |
| 2011/0082759 A1 | 4/2011 | Swinson et al. |
| 2011/0082804 A1 | 4/2011 | Swinson et al. |
| 2011/0131652 A1 | 6/2011 | Robinson et al. |
| 2011/0173227 A1 | 7/2011 | Klein |
| 2011/0202471 A1 | 8/2011 | Scott et al. |
| 2011/0264595 A1 | 10/2011 | Anspach et al. |
| 2012/0005070 A1 | 1/2012 | McFall et al. |
| 2012/0005108 A1 | 1/2012 | Hollenshead et al. |
| 2012/0197699 A1 | 8/2012 | Snell et al. |
| 2012/0233014 A1 | 9/2012 | Banks et al. |
| 2012/0259728 A1 | 10/2012 | Inghelbrecht et al. |
| 2012/0284087 A1 | 11/2012 | Pollak |
| 2012/0284113 A1 | 11/2012 | Pollak |
| 2012/0316997 A1 | 12/2012 | Herbert |
| 2012/0330723 A1 | 12/2012 | Hedy |
| 2013/0006876 A1 | 1/2013 | Swinson et al. |
| 2013/0018752 A1 | 1/2013 | Foster |
| 2013/0030870 A1 | 1/2013 | Swinson et al. |
| 2013/0103457 A1 | 4/2013 | Marshall et al. |
| 2013/0117067 A1 | 5/2013 | Sullivan et al. |
| 2013/0191247 A1 | 7/2013 | Huang et al. |
| 2013/0304571 A1 | 11/2013 | Swinson et al. |
| 2013/0311319 A1 | 11/2013 | Noy et al. |
| 2013/0311341 A1 | 11/2013 | Noy et al. |
| 2013/0339173 A1 | 12/2013 | Skutta |
| 2014/0032352 A1 | 1/2014 | Fraser et al. |
| 2014/0032353 A1 | 1/2014 | Fraser et al. |
| 2014/0058957 A1 | 2/2014 | Swinson et al. |
| 2014/0067615 A1 | 3/2014 | Park et al. |
| 2014/0074553 A1 | 3/2014 | Sullivan et al. |
| 2014/0089208 A1 | 3/2014 | Humble et al. |
| 2014/0114726 A1 | 4/2014 | Swinson et al. |
| 2014/0149183 A1 | 5/2014 | Liu et al. |
| 2014/0214491 A1 | 7/2014 | Semeniuk et al. |
| 2014/0214696 A1 | 7/2014 | Laughlin et al. |
| 2014/0229240 A1 | 8/2014 | Taira et al. |
| 2014/0229241 A1 | 8/2014 | Taira et al. |
| 2014/0229391 A1 | 8/2014 | East, III et al. |
| 2014/0237410 A1 | 8/2014 | Klein |
| 2014/0244424 A1 | 8/2014 | Swinson et al. |
| 2014/0257934 A1 | 9/2014 | Chrzan et al. |
| 2014/0258044 A1 | 9/2014 | Chrzan et al. |
| 2014/0278806 A1 | 9/2014 | Duguid et al. |
| 2014/0279020 A1 | 9/2014 | Duguid et al. |
| 2014/0279171 A1 | 9/2014 | Burgiss et al. |
| 2014/0279229 A1 | 9/2014 | Burgiss et al. |
| 2014/0279263 A1 | 9/2014 | Liu et al. |
| 2014/0279275 A1 | 9/2014 | Burgiss et al. |
| 2014/0279709 A1 | 9/2014 | Lander et al. |
| 2014/0351074 A1 | 11/2014 | Enge et al. |
| 2014/0358719 A1 | 12/2014 | Inghelbrecht et al. |
| 2015/0058152 A1 | 2/2015 | Pollak et al. |
| 2015/0134422 A1 | 5/2015 | Swinson et al. |
| 2015/0193800 A1 | 7/2015 | Taira et al. |
| 2015/0206162 A1 | 7/2015 | Taira et al. |
| 2015/0206206 A1 | 7/2015 | Puente et al. |
| 2015/0220876 A1 | 8/2015 | Sethi et al. |
| 2015/0242926 A1 | 8/2015 | Taira et al. |
| 2015/0310466 A1 | 10/2015 | Lacivita et al. |
| 2015/0324737 A1 | 11/2015 | Chrzan et al. |
| 2015/0324879 A1 | 11/2015 | Lu et al. |
| 2015/0356672 A1 | 12/2015 | Humble et al. |
| 2015/0363838 A1 | 12/2015 | Wu et al. |
| 2015/0363865 A1 | 12/2015 | Ramanuja et al. |
| 2016/0343058 A1 | 11/2016 | Levy et al. |
| 2016/0371323 A1 | 12/2016 | Garcia, III et al. |
| 2017/0109768 A1 | 4/2017 | Swinson et al. |
| 2017/0109769 A1 | 4/2017 | Inghelbrecht et al. |
| 2017/0109799 A1 | 4/2017 | Swinson et al. |
| 2017/0109833 A1 | 4/2017 | Taira et al. |
| 2017/0286983 A1 | 10/2017 | Taira et al. |
| 2017/0372381 A1 | 12/2017 | Swinson et al. |
| 2018/0158086 A1 | 6/2018 | Taira et al. |
| 2019/0139065 A1 | 5/2019 | Taira et al. |
| 2019/0172103 A1 | 6/2019 | Swinson et al. |
| 2019/0180305 A1 | 6/2019 | Inghelbrecht et al. |
| 2019/0180306 A1 | 6/2019 | Inghelbrecht et al. |
| 2020/0005344 A1 | 1/2020 | Taira et al. |
| 2020/0034862 A1 | 1/2020 | Inghelbrecht et al. |
| 2020/0051102 A1 | 2/2020 | Taira et al. |
| 2020/0051134 A1 | 2/2020 | Laughlin et al. |

FOREIGN PATENT DOCUMENTS

| | | |
|---|---|---|
| CN | 1892691 | 1/2007 |
| CN | 101785023 A | 7/2010 |
| EP | 1326176 | 9/2003 |
| JP | 2001-306851 | 1/2001 |
| JP | 2001-117973 | 4/2001 |
| JP | 2001-155106 | 6/2001 |
| JP | 2001-209674 | 8/2001 |
| JP | 2001-256356 | 9/2001 |
| JP | 2002-117275 | 4/2002 |
| JP | 2002-132827 | 5/2002 |
| JP | 2002-329097 | 11/2002 |
| JP | 2002-358478 | 12/2002 |
| JP | 2003-024387 | 1/2003 |
| JP | 2003-108811 | 4/2003 |
| JP | 2003-108847 | 4/2003 |
| JP | 2003-173406 | 6/2003 |
| JP | 2004-070534 | 3/2004 |
| JP | 2004-516554 | 6/2004 |
| JP | 2004-213065 | 7/2004 |
| JP | 2006-268635 | 10/2006 |
| JP | 2007-122197 | 5/2007 |
| JP | 2008-058039 | 3/2008 |
| JP | 2008-165764 | 7/2008 |
| WO | WO200140898 A2 | 6/2001 |
| WO | WO 2007002684 | 1/2007 |

(56) References Cited

FOREIGN PATENT DOCUMENTS

| WO | WO2007002754 A2 | 1/2007 |
|---|---|---|
| WO | WO200140898 A3 | 11/2007 |
| WO | WO 2010030632 | 3/2010 |

OTHER PUBLICATIONS

Notice of Allowance issued for U.S. Appl. No. 16/272,396, dated Jul. 15, 2019, 10 pages.
Notice of Allowance issued for U.S. Appl. No. 16/277,553, dated Aug. 16, 2019, 10 pages.
Notice of Allowance issued for U.S. Appl. No. 16/277,434, dated Aug. 19, 2019, 10 pages.
Office Action issued for Chinese Application for Invention No. 201710105808.X, dated Jan. 22, 2020, 13 pages.
Examination Report issued for Canadian Patent Application No. 2,837,338, dated Feb. 3, 2020, 6 pages.
Notice of Allowance issued for U.S. Appl. No. 16/272,396, dated Mar. 9, 2020, 8 pages.
Notice of Allowance issued for U.S. Appl. No. 14/031,930, dated Sep. 20, 2019, 34 pages.
Notice of Allowance issued for U.S. Appl. No. 16/193,618, dated Sep. 23, 2019, 10 pages.
Office Action issued for U.S. Appl. No. 15/391,563, dated Sep. 25, 2019, 19 pages.
Office Action issued for Canadian Patent Application No. 2,736,477, dated Oct. 23, 2019, 5 pages.
Notice of Allowance issued for U.S. Appl. No. 16/272,396, dated Dec. 10, 2019, 8 pages.
Notice of Allowance issued for U.S. Appl. No. 15/674,317, dated Jan. 17, 2019, 11 pages.
Notice of Allowance issued for U.S. Appl. No. 15/391,541, dated Jan. 23, 2019, 11 pages.
Notice of Allowance issued for U.S. Appl. No. 15/393,505, dated Jan. 28, 2019, 15 pages.
Notice of Allowance issued for U.S. Appl. No. 13/173,357, dated Feb. 27, 2019, 8 pages.
Office Action issued for Canadian Patent Application No. 2,837,338, dated Feb. 28, 2019, 5 pages.
International Search Report and Written Opinion for PCT Application No. PCT/US2009/056316, dated Oct. 26, 2009, 7 pages.
International Search Report and Written Opinion for PCT Application No. PCT/US2009/056315, dated Oct. 20, 2009, 7 pages.
International Search Report and Written Opinion for PCT Application No. PCT/US2009/056317, dated Dec. 10, 2009, 8 pages.
Office Action issued for U.S. Appl. No. 12/556,137, dated Sep. 1, 2010, 14 pages.
cars.com, http://cars.com/ Internet Archive Jul. 18, 2007—http://web.archive.org/web/20070718071752/www.car.com/, printed Aug. 27, 2010, 2 pages.
Office Action issued for U.S. Appl. No. 12/556,137, dated Dec. 30, 2010, 15 pages.
edmunds.com http://www.edmunds.com/Internet Archive Jan. 18, 2010—http://web.archive.org/web/20080118210310/http://www.edmunds.com/ printed Dec. 15, 2010, 3 pages.
Office Action issued for U.S. Appl. No. 13/080,832, dated Oct. 12, 2011, 12 pages.
2nd Written Opinion issued for PCT Application No. PCT/US09/56317, dated Dec. 6, 2011, 6 pages.
Office Action issued for U.S. Appl. No. 12/556,076 dated Dec. 27, 2011, 13 pages.
Office Action issued for U.S. Appl. No. 12/556,109 dated Jan. 24, 2012, 16 pages.
"CarPrices.com, Selectica and JATO Dynamics Enter Agreement to Deliver Online Car Configuration Package", Business Wire, Dec. 13, 1999, 5 pages.
Office Action issued for U.S. Appl. No. 12/556,076, dated Mar. 26, 2012, 14 pages.
Office Action issued for U.S. Appl. No. 12/556,109, dated Mar. 26, 2012, 15 pages.
Goldberg, "Job Security through PPC-CRM Integration", paydigest.com, published Aug. 22, 2007.
Sauberlich, et al. "Analytical Lead Management in the Automotive Industry," Data Analysis and Decision Support, Springer Heidelberg Berlin 2005, pp. 290-299.
Office Action issued for U.S. Appl. No. 11/968,137, dated Dec. 23, 2010, 8 pages.
Office Action issued for U.S. Appl. No. 11/968,137, dated Jun. 9, 2011, 9 pages.
Office Action issued for U.S. Appl. No. 11/968,137, dated Dec. 19, 2011, 10 pages.
Gregory M. Collins, "Technology Opens Up Huge CRM Opportunities for Retailers," Jun. 10, 2002. Retrieved from http://www.destinationcrm.com/Articles/PrintArticle.aspx?ArticleID=47419, 3 pages.
Rick Gibbs, "How Google Base Replaces Autos Classifieds", Nov. 27, 2006. Retrieved from http://www.imediaconnection.com/printpage.aspx?id=12548, 4 pages.
No Author, "3 Reasons Why Using Google Pays Off for Automobile Dealers," 2005 Retrieved from http://www.kaistudios.com/PPC/guides/Google-autodealers.htm, 2 pages.
Office Action issued for U.S. Appl. No. 12/179,164, dated Sep. 30, 2009, 19 pages.
"Innovative Website Moves Consumer Auto Purchases Online: Capital One Offers Miami Buyers a One-Stop Resource for Car Purchase, Putting an End to Hassles and Frustration," Business Wire, Jul. 18, 2006, 3 pages.
Office Action issued for U.S. Appl. No. 12/179,164, dated Oct. 27, 2010, 20 pages.
Office Action issued for U.S. Appl. No. 12/179,164, dated Feb. 15, 2011, 20 pages.
Office Action issued for U.S. Appl. No. 12/179,164, dated Sep. 2, 2011, 21 pages.
International Preliminary Report on Patentability (IPRP) issued for PCT Patent Application No. PCT/US2009/056316, dated May 1, 2012, 6 pages.
Extended European Search Report issued for European Patent Application No. 09 813 513.0, dated Feb. 21, 2012, 8 pages.
Extended European Search Report issued for European Patent Application No. 09 813 514.8, dated Apr. 25, 2012, 5 pages.
International Preliminary Report on Patentability (IPRP) issued for PCT Patent Application No. PCT/US2009/056315, dated May 16, 2012, 6 pages.
Office Action issued for U.S. Appl. No. 12/179,164, dated May 25, 2012, 21 pages.
Office Action issued for Chinese Patent Application No. 200980141911.3, dated May 30, 2012, 4 pages.
Office Action (with English translation) for Chinese Patent Application No. 200980142589.6, dated Sep. 5, 2012, 9 pages.
International Preliminary Report on Patentability for International Patent Application No. PCT/US2009/056317, dated Sep. 27, 2012, 8 pages.
Office Action issued for U.S. Appl. No. 12/179,164, dated Oct. 9, 2012, 20 pages.
"Zag Acquires Automotive Invitational Services, Auto-Buying Service for More than 6 Million AAA Members," Business Wire, Jun. 13, 2006, 3 pages.
Office Action issued for U.S. Appl. No. 13/524,116, dated Nov. 27, 2012, 13 pages.
Office Action issued for U.S. Appl. No. 12/179,164, dated Jan. 29, 2013, 19 pages.
Office Action issued for Chinese Patent Application No. 200980141911.3, dated Feb. 6, 2013, 9 pages.
Examination Report issued for European Patent Application No. 09 813 513.0, dated Mar. 20, 2013, 7 pages.
"Carfax and EDS Announce New On-Line Service," PR Newswire, Oct. 13, 1994, 2 pages.
Office Action issued for U.S. Appl. No. 12/179,164, dated May 8, 2013, 19 pages.
Office Action issued for Chinese Patent Application No. 200980142589.6, dated Apr. 15, 2013, 10 pages.

(56) References Cited

OTHER PUBLICATIONS

Office Action (with English Translation) for Japanese Patent Application No. 2011-526297, dated Jul. 22, 2013, 19 pages.
Office Action (with English translation) for Japanese Patent Application No. 2011-526298, dated Jul. 22, 2013, 21 pages.
Office Action (with English translation) for Chinese Patent Application No. 200980141911.3, dated Jul. 26, 2013, 20 pages.
Office Action issued for Chinese Patent Application No. 200980142589.6, dated Oct. 21, 2013, 13 pages.
Office Action issued for U.S. Appl. No. 13/942,375, dated Nov. 20, 2013, 13 pages.
Office Action issued for U.S. Appl. No. 12/179,164, dated Jan. 3, 2014, 23 pages.
Office Action (with English translation) for Chinese Patent Application No. 200980141911.3, dated Feb. 21, 2014, 14 pages.
Notice of Allowance issued for Japanese Patent Application No. 2011-526297, dated Mar. 28, 2014, 3 pages.
Notice of Allowance issued for Japanese Patent Application No. 2011-526298, dated Mar. 28, 2014, 3 pages.
Office Action issued for U.S. Appl. No. 12/179,164, dated May 6, 2014, 13 pages.
Office Action issued for Chinese Patent Application No. 200980142589.6, dated May 8, 2014, 10 pages.
Office Action issued for U.S. Appl. No. 13/942,375, dated Jun. 12, 2014, 17 pages.
Office Action issued in U.S. Appl. No. 14/256,796, dated Aug. 14, 2014, 12 pages.
Office Action issued in U.S. Appl. No. 14/256,791, dated Aug. 26, 2014, 12 pages.
Office Action issued in U.S. Appl. No. 12/556,076, dated Sep. 2, 2014, 7 pages.
Office Action issued in U.S. Appl. No. 12/556,109, dated Sep. 2, 2014, 7 pages.
Office Action issued in U.S. Appl. No. 12/179,164, dated Sep. 15, 2014, 15 pages.
Office Action issued in U.S. Appl. No. 13/942,375, dated Oct. 6, 2014, 6 pages.
Office Action issued for U.S. Appl. No. 12/179,164, dated Dec. 24, 2014, 14 pages.
International Search Report and Written Opinion issued for PCT Application No. PCT/US2012/047672, dated Oct. 10, 2012, 7 pages.
Office Action issued for U.S. Appl. No. 13/554,743, dated Nov. 8, 2012, 18 pages.
Office Action issued for U.S. Appl. No. 13/554,743, dated May 31, 2013, 35 pages.
Debruine et al. "Capacity Costs with Time-Based and Use-Based Asset Value Attrition," Accounting Horizons, vol. 25, No. 2, 2011, pp. 337-356.
Hartman, "Automobile Replacement Case Studies for Engineering Economy Classes," The Engineering Economist, Spring 1998, vol. 43, No. 3, pp. 278-289.
Ohta et al, "Automobile Prices Revisited: Extensions of the Hedonic Hypothesis," Household Production and Consumption, National Bureau of Economic Research, 1976, vol. ISBN: 0-870-14515-0, pp. 325-398.
Prado, "The European Used-Car Market at a Glance: Hedonic Resale Price Valuation in Automotive Leasing Industry," Aug. 2009, Economics Bulletin, vol. 29 No. 3 pp. 2086-2099.
International Preliminary Report on Patentability issued for PCT Application No. PCT/US2012/047672, dated Apr. 3, 2014, 6 pages.
Office Action issued for U.S. Appl. No. 14/145,252, dated Dec. 3, 2014, 18 pages.
International Search Report and Written Opinion issued for PCT Application No. PCT/US12/44128, dated Sep. 12, 2012, 6 pages.
International Preliminary Report on Patentability issued for PCT Application No. PCT/US12/44128, dated Jan. 16, 2014, 5 pages.
Office Action issued for U.S. Appl. No. 13/173,357, dated Jul. 31, 2013, 19 pages.
Office Action issued for U.S. Appl. No. 13/173,357, dated Feb. 26, 2014, 28 pages.
Office Action issued for U.S. Appl. No. 14/054,390, dated Dec. 3, 2014, 13 pages.
Extended European Search Report issued for European Patent Application No. 12817230.1, dated Dec. 15, 2014, 5 pages.
Decision of Rejection issued for Chinese Patent Application No. 200980142589.6, dated Nov. 13, 2014, 10 pages.
Office Action issued for U.S. Appl. No. 13/173,357, dated Mar. 9, 2015, 26 pages.
Office Action issued for U.S. Appl. No. 14/666,005, dated Apr. 21, 2015, 12 pages.
Extended European Search Report issued for European Patent Application No. 15159912.3, dated May 19, 2015, 8 pages.
Office Action issued for U.S. Appl. No. 14/145,252, dated Jun. 26, 2015, 21 pages.
Office Action issued for U.S. Appl. No. 14/666,005, dated Sep. 11, 2015, 13 pages.
Office Action issued for U.S. Appl. No. 13/173,357, dated Oct. 2, 2015, 30 pages.
Office Action issued for U.S. Appl. No. 14/145,252, dated Oct. 6, 2015, 26 pages.
Office Action issued for Canadian Patent Application No. 2,736,477, dated Nov. 18, 2015, 6 pages.
Office Action issued for U.S. Appl. No. 12/179,164, dated Nov. 23, 2015, 21 pages.
Osler, Brian, "Rip-Off USA: The North American Car Market," Consumer Policy Review, Nov./Dec. 2002, vol. 12, No. 6, pp. 1-7.
Office Action issued for Japanese Patent Application No. 2014-522909, dated Nov. 6, 2015, 13 pages.
Office Action issued for Canadian Patent Application No. 2,837,338, dated Feb. 1, 2016, 4 pages.
Office Action issued for U.S. Appl. No. 14/666,005, dated Apr. 18, 2016, 10 pages.
Office Action issued for European Application No. 12817230.1, dated Mar. 16, 2016, 4 pages.
Office Action issued for European Application No. 15159912.3, dated May 18, 2016, 4 pages.
Notice of Allowance issued for Japanese Patent Application No. 2014-522939, dated May 31, 2016, 3 pages.
Office Action issued for U.S. Appl. No. 14/145,252, dated Jun. 15, 2016, 10 pages.
Office Action issued for U.S. Appl. No. 13/951,292, dated Jun. 20, 2016, 17 pages.
Office Action issued for Chinese Application No. 200980142589.6, dated Jul. 1, 2016, 4 pages.
Office Action issued for U.S. Appl. No. 14/068,836, dated Jul. 20, 2016, 13 pages.
Office Action issued for U.S. Appl. No. 14/666,005, dated Sep. 1, 2016, 7 pages.
Office Action issued for U.S. Appl. No. 14/031,930, dated Oct. 3, 2016, 25 pages.
Office Action issued for U.S. Appl. No. 12/179,164, dated Oct. 6, 2016, 10 pages.
Office Action issued for U.S. Appl. No. 14/026,111, dated Oct. 19, 2016, 24 pages.
Office Action issued for U.S. Appl. No. 14/145,252, dated Oct. 20, 2016, 9 pages.
Youngs, "Three Values Associated with Used-Vehicle Pricing," J.D. Power, <<http://www.jdpower.com/cars/articles/tips-advice/three-values-associated-used-vehicle-pricing.>>, Feb. 24, 2012, 1 page.
Office Action issued for Chinese Application No. 201280035026.9, dated Sep. 29, 2016, 15 pages.
Office Action issued for U.S. Appl. No. 13/951,292, dated Nov. 22, 2016, 9 pages.
Reexamination Decision issued for Chinese Application No. 200980142589.6, dated Nov. 29, 2016, 12 pages.
Office Action issued for U.S. Appl. No. 14/068,836, dated Dec. 22, 2016, 9 pages.
Office Action issued for Canadian Patent Application No. 2,736,477, dated Nov. 28, 2016, 6 pages.
Office Action issued for Canadian Patent Application No. 2,837,338, dated Dec. 28, 2016, 4 pages.

(56) References Cited

OTHER PUBLICATIONS

Notice of Allowance issued for Japanese Patent Application No. 2016-021490, dated Feb. 16, 2017, 3 pages.
Office Action issued for U.S. Appl. No. 12/179,164, dated Feb. 28, 2017, 17 pages.
Office Action issued for U.S. Appl. No. 14/145,252, dated Apr. 19, 2017, 11 pages.
Office Action issued for U.S. Appl. No. 15/396,225, dated Apr. 19, 2017, 13 pages.
Office Action issued for U.S. Appl. No. 13/173,357, dated May 3, 2017, 26 pages.
Office Action issued for U.S. Appl. No. 14/026,111, dated May 26, 2017, 33 pages.
Notice of Allowance issued for Chinese Application No. 201280035026.9, dated May 25, 2017, 2 pages.
Office Action issued for U.S. Appl. No. 14/031,930, dated Jun. 15, 2017, 11 pages.
Office Action issued for U.S. Appl. No. 14/145,252, dated Aug. 24, 2017, 18 pages.
Office Action issued for U.S. Appl. No. 13/173,357, dated Oct. 30, 2017, 28 pages.
Office Action issued for U.S. Appl. No. 15/396,225, dated Oct. 19, 2017, 14 pages.
Office Action issued for U.S. Appl. No. 14/031,930, dated Oct. 4, 2017, 16 pages.
Office Action issued for Canadian Application No. 2,736,477, dated Nov. 3, 2017, 4 pages.
Office Action issued for U.S. Appl. No. 14/145,252, dated Jan. 10, 2018, 12 pages.
Office Action issued for U.S. Appl. No. 15/396,225, dated Jan. 23, 2018, 14 pages.
Office Action issued for Canadian Patent Application No. 2,837,338, dated Feb. 2, 2018, 5 pages.
Summons to Attend Oral Proceedings issued for European Patent Application No. 12817230.1, mailed Feb. 9, 2018, 10 pages.
Office Action issued for U.S. Appl. No. 14/026,111, dated Feb. 28, 2018, 41 pages.
Office Action issued for U.S. Appl. No. 13/173,357, dated Apr. 16, 2018, 11 pages.
Office Action issued for U.S. Appl. No. 15/864,855, dated May 29, 2018, 13 pages.
Office Action issued for U.S. Appl. No. 14/031,930, dated Jun. 14, 2018, 16 pages.
Notice of Allowance issued for U.S. Appl. No. 14/145,252, dated Jun. 20, 2018, 8 pages.
Notice of Allowance issued for U.S. Appl. No. 15/864,855, dated Oct. 2, 2018, 6 pages.
Notice of Allowance issued for U.S. Appl. No. 13/173,357, dated Oct. 25, 2018, 12 pages.
Office Action issued for U.S. Appl. No. 14/031,930, dated Oct. 17, 2018, 12 pages.
Office Action issued for Canadian Patent Application No. 2,736,477, dated Oct. 31, 2018, 5 pages.
Notice of Allowance issued for U.S. Appl. No. 15/391,563, dated May 14, 2020, 9 pages.

* cited by examiner

| BIN | YEAR | MAKE | MODEL | ZIP CODE |
|---|---|---|---|---|
| 1 | 2009 | HONDA | CIVIC | 90401 |
| 2 | 2005 | TOYOTA | CAMRY | 78701 |
| ... | ... | ... | ... | ... |

| YEAR | MAKE | MODEL | TRIM | ZIP CODE | PR |
|---|---|---|---|---|---|
| 2009 | HONDA | CIVIC | DX | 90401 | 0.96 |
| 2009 | HONDA | CIVIC | LX | 90401 | 0.958 |
| 2009 | HONDA | CIVIC | LX | 90402 | 0.967 |
| 2009 | HONDA | CIVIC | EX | 90403 | 0.974 |
| ... | ... | ... | ... | ... | ... |

Tell Us About Your Vehicle to Get the Most Accurate Price                                                              ✕

2007 Chevrolet Silverado 2500HD Truck

Style:                                       Mileage:
[ 2WD Reg Cab 133" Work Truck ▼ ]            [ 48000 ]

Condition

○ Fair
Significant interior or exterior wear, limited serviceable life

◉ Good
Majority of used cars, normal interior and exterior wear, clean title ○ Excellent
Top 5% of used cars, no accidents little interior and exterior wear

[ ◁ |||| ▷ ]

Engine
◉ VORTEC 6.0L VARIABLE VALVE TIMING V8 SFI
○ DURAMAX 6.6L TURBO DIESEL V8

Transmission
◉ 6-SPEED AUTOMATIC, HEAVY-DUTY, ELECTRONICALLY CONTROLLED

Optional Features
☐ TRAILERING EQUIPMENT, HEAVY-DUTY
☐ LS PACKAGE
☐ ALTERNATOR, DUAL, 125 AMPS EACH
☐ BRAKE CONTROLLER, INTEGRATED TRAILER
☐ CARGO MANAGEMENT
☐ BATTERY, AUXILIARY HEAVY-DUTY 600 COLD-CRANKING AMPS, MAINTENANCE FREE

[ Cancel ]   [ View Price Report ]

*FIG. 7*

SYSTEM AND METHOD FOR ANALYSIS AND PRESENTATION OF USED VEHICLE PRICING DATA

CROSS-REFERENCE TO RELATED APPLICATIONS

This application is a continuation of, and claims a benefit of priority under 35 U.S.C. § 120 from U.S. patent application Ser. No. 14/145,252, filed Dec. 31, 2013, issued as U.S. Pat. No. 10,108,989, entitled "SYSTEM AND METHOD FOR ANALYSIS AND PRESENTATION OF USED VEHICLE PRICING DATA," which is a continuation of and claims a benefit of priority under 35 U.S.C. 120 from U.S. patent application Ser. No. 13/554,743, filed on Jul. 20, 2012, issued as U.S. Pat. No. 8,645,193, entitled "SYSTEM AND METHOD FOR ANALYSIS AND PRESENTATION OF USED VEHICLE PRICING DATA," which, in turn, claims a benefit of priority under 35 U.S.C. § 119(e) from U.S. Provisional Application No. 61/512,787, filed Jul. 28, 2011, entitled "SYSTEM AND METHOD FOR ANALYSIS AND PRESENTATION OF USED VEHICLE PRICING DATA," All applications referenced in this paragraph are fully incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the aggregation, analysis, and presentation of transaction and pricing data related to vehicles, including used vehicles.

BACKGROUND OF THE RELATED ART

Sellers sometimes have a difficult time determining how they should price a used vehicle. This difficulty is exacerbated by the vagaries of used car transactions, especially in comparison with the sale or purchase of new cars.

For example, (a) condition is a critical factor to the value of a used car but it doesn't apply to new cars; (b) Mileage on a used car affects the value whereas it can be ignored on new cars; (c) In general, the older the vehicle, the less the price; age is not an issue with new cars; (d) Used car pricing has a much wider range of model years and many more vehicle models to work with; new cars only include at most vehicles in the most recent 2 or 3 model years; (e) Sales velocity drops dramatically for older vehicles, especially for those 10+ years old cars; thus, far fewer data points for analysis are available; In most cases, an adequate number of comparable new car transactions are available; (f) Options on a particular used car cannot be configured. For new cars, options can be customized with dealer-installed options or by direct order from manufacturers.

It is thus desirable to account for these various challenges and factors when providing a buyer or seller with pricing data associated with a specified used vehicle, including for example, historical transaction data, a trade-in price, a list price, an expected sale price or range of sale prices or an expected time to sale. It is also desired that certain of the pricing data be presented in conjunction with the transaction data associated with the specified used vehicle. It is further desired that this transaction data may be presented as a distribution of the transaction data and certain pricing data including such price points as market low sale price, market average sale price or market high sale price may be presented relative to the transaction data.

SUMMARY OF THE DISCLOSURE

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

Embodiments of systems and methods for the aggregation, analysis, and display of data for used vehicles are disclosed. In particular, in certain embodiments, historical transaction data for used vehicles may be obtained and processed to determine pricing data, where this determined pricing data may be associated with a particular configuration of a vehicle. The user can then be presented with an interface pertinent to the vehicle configuration utilizing the aggregated data set or the associated determined data where the user can make a variety of determinations. This interface may, for example, be configured to present the historical transaction data visually, with the pricing data such as a trade-in price, a list price, an expected sale price or range of sale prices, market low sale price, market average sale price, market high sale price, etc. presented relative to the historical transaction data.

In one embodiment, modeling that accounts for various factors may be utilized to accurately estimate sale and listing prices for a given used car. Embodiments of such a modeling approach may include the development of a set of depreciation functions associated with vehicle trims to facilitate estimation of the base value of a used car. Key factors may be incorporated into regression models to estimate their individual impact or interactions. These factors may include, for example: Mileage; Condition; Geographic information (region, state, zip code, metro, DMA, etc.); Demographic information (household income, house value, etc.); Vehicle attributes (transmission, engine, drive train, hybrid, electric, etc.); Vehicle options; Days to sell; etc. The days-to-sell factor may be utilized to capture the market attribute that for a given used car the expected price varies depending on how soon the owner wants to sell their vehicle.

In certain embodiments, in addition to the above factors that are considered in regression models, clustering approaches may also be applied to overcome sparse data. The purpose of this clustering may be to identify similar vehicles and similar geographic regions so that data points can be pooled together for regression analysis. Thus, using embodiments of this modeling or regression, pricing data, including estimated sales prices or listing prices may be determined.

Using such estimated sales prices or listing price (e.g., a price at which the car may be offered for sale) for a used vehicle, then, a seller can better make decisions regarding the sale of a used vehicle, as the market factors corresponding to the vehicle may be better understood. In fact, embodiments of such vehicle data systems can help everyone involved in the used car sales process including sellers (e.g., private sellers, wholesalers, dealers, etc.) and consumers, and even intermediaries by presenting both simplified and complex views of data. By utilizing visual interfaces in certain embodiments pricing data may be presented as a price curve, bar chart, histogram, etc. that reflects quantifiable prices or price ranges relative to reference pricing data points. Using these types of visual presentations may enable a user to better understand the pricing data related to a specific vehicle configuration. Such interfaces may be, for example, a website such that the user can go to the website to provide relevant information concerning a specific vehicle configuration and the interface corresponding to the specific vehicle configuration is presented to the user through the website.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 7 depicts one embodiment of an interface.

DETAILED DESCRIPTION

Figure 1:
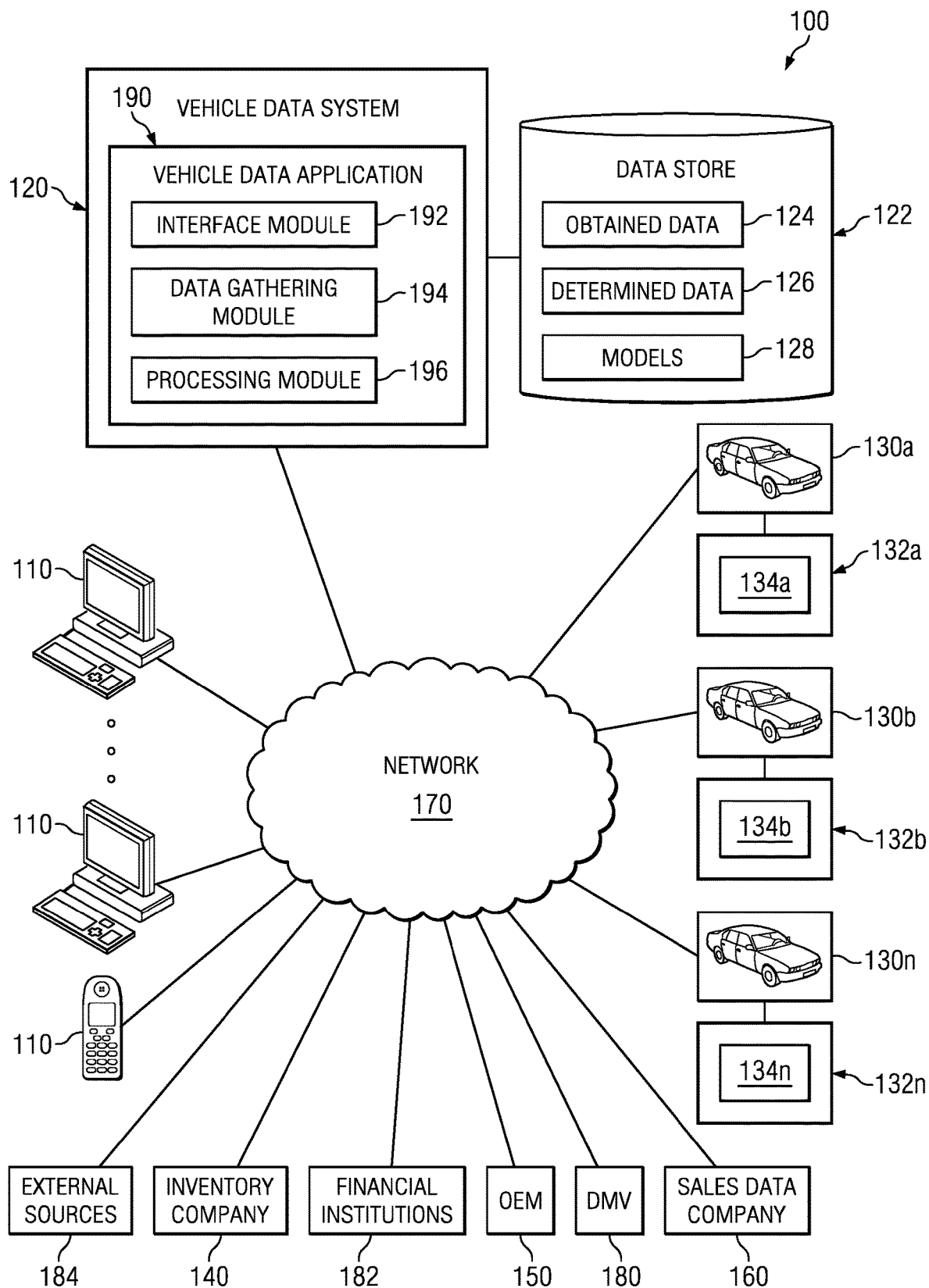
FIG. 1 depicts of one embodiment of a topology including a vehicle data system.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices.

Attention is now directed to the aggregation, analysis, display and of pricing data for vehicles, including used vehicles. In particular, actual sales transaction data may be obtained from a variety of sources. This historical transaction data may be aggregated into data sets and the data sets processed to determine desired pricing data, where this determined pricing data may be associated with a particular configuration (e.g., make, model, power train, options, mileage, etc.) of a vehicle. An interface may be presented to a user where a user may provide relevant information such as attributes of a vehicle configuration, a geographic area, etc. The user can then be presented with a display pertinent to the provided information utilizing the aggregated data set or associated determined pricing data where the user can make a variety of determinations such as a trade-in price, a list price, an expected sale price or range of sale prices or an expected time to sale.

In one embodiment, the expected sale price, or sale prices within a range of expected sale prices may have a percentage certainty associated with them which reflect the probability of the specified used vehicle selling at that price. The list price and the expected sale price may be linked to a number of average days to sale such that the list price, expected sale price and average days to sale may be interdependent. The interface may offer a user the ability to adjust one or more pieces of this pricing data (e.g., the average number of days to sale) and thereby adjust the interface to present the pricing data calculated in response to this adjustment. Furthermore, such pricing data may be presented in conjunction with transaction data associated with the specified used vehicle. This transaction data may be presented as a distribution of the transaction data and include pricing data including such price points such as market low sale price, market average sale price or market high sale price.

In certain embodiments, then, using data feeds from multiple sources, model variables may be constructed and multivariate regressions for generating pricing data for used car valuations may be built. In the used car space, there are multiple price points that are of interest, including specifically List Prices, Sale Prices, and Trade-In Prices.

Thus, embodiments of the systems and methods disclosed herein can provide accurate pricing guidance with respect to at least each of these price points, along with a range of sale prices that may be useful for both a buyer and/or a seller.

To provide such information embodiments may utilize the following approach: when a user enters his vehicle information into a user interface, variables about the specifics of that vehicle are obtained. For example, data on year, make, model, options, transmission, engine cylinders, color, condition, mileage, original MSRP and Invoice price are may be obtained. From this data, a baseline valuation can be obtained. This valuation can be calculated in multiple ways depending on the embodiment, but, in one embodiment may effectively be a depreciation value for the class of vehicle associated with the vehicle selected by the user. Also, at this time, the vehicle's "bin" may be specified: the bin is defined as the group of vehicles in the historical transactions that are of the same make, model, body type, same year (or generation), similar time frame, or similar geography. Recent transactions (e.g., within a certain time window) within the same bin may be evaluated based on a model (which will be described in more detail later herein), to make further refinements to the price being anticipated for the vehicle. This process may be done for listing, sale, and trade-in prices.

In some embodiments, to increase the efficiency of the process while still tailoring the results to the individual user's unique specifications, at least some pre-calculation (e.g., calculation done before a specific request from a user for data for a specified vehicle) may be done. This pre-calculation may be done in what will herein be referred to as the "backend." The backend as used herein means that it may not be done in response to a user request, or may be done at any point before a particular user requests data on a specified vehicle. Thus, for example, if certain calculations are on certain time frame (e.g., every day, every week, every hour, etc.) these may be considered to be done on the backend. Additionally, for example, if calculations are done before a first user specifies a vehicle and requests pricing data on that vehicle pre-calculation may have been done on the backend with respect to that first user and his request. If certain calculations are done after the first user has received his information but before a second user requests data on a specified vehicle those calculation may be understood to have been done on the backend. When such pre-calculation occurs, after the user requests data on a specified vehicle configuration, there may be a process flow for handling this user provided incremental data (for example, in conjunction with the data calculated in the backend) to ensure the results are better tailored to the user's specific vehicle attributes.

Embodiments of the above systems and methods will now be described herein in more detail. As an overview, initially a general description on data and data sources utilized will be described. Then, the method utilized to construct a model based on a research data set is described. In certain embodiments, models may be constructed on one or more different levels, for example, a model may be built on a national level, a make level, a model level, a bin level, etc. Furthermore, there may be a set of models for each price which it is desired to determine. For example, there may be a set of models for list price, a set of model for sale price and a set of models for trade in price. Thus, for example, there may be a set of models for list price, each model corresponding to a bin; a set of models for sale price, each model corresponding to a bin and a set of models for trade in price, each model corresponding to a bin. Finally, the implementation and use of a model is described, including the use of such a model in the frontend (calculations done in response to a user's request for data for a specific vehicle configuration) phases of that implementation.

Embodiments of the systems and methods of the invention may be better explained with reference to FIG. 1 which depicts one embodiment of a topology which may be used to implement certain embodiments. Topology 100 comprises a set of entities including vehicle data system 120 (also referred to herein as the TrueCar system) which is coupled through network 170 to computing devices 110 (e.g., computer systems, personal data assistants, kiosks, dedicated terminals, mobile telephones, smart phones, etc.), and one or more computing devices at inventory companies 140, original equipment manufacturers (OEM) 150, sales data companies 160, financial institutions 182, external information sources 184, departments of motor vehicles (DMV) 180, and one or more associated point of sale locations, in this embodiment, car dealers 130. Network 170 may be for example, a wireless or wireline communication network such as the Internet or wide area network (WAN), publicly switched telephone network (PTSN) or any other type of electronic or non-electronic communication link such as mail, courier services or the like.

Vehicle data system 120 may comprise one or more computer systems with central processing units executing instructions embodied on one or more computer readable media where the instructions are configured to perform at least some of the functionality associated with embodiments of the invention. These applications may include a vehicle data application 190 comprising one or more applications (instructions embodied on a computer readable media) configured to implement an interface module 192, data gathering module 194, and processing module 196 utilized by the vehicle data system 120. Furthermore, vehicle data system 120 may include data store 122 operable to store obtained data 124, data 126 determined during operation, models 128 which may comprise a set of dealer cost model or price ratio models, or any other type of data associated with embodiments of the invention or determined during the implementation of those embodiments.

Vehicle data system 120 may provide a wide degree of functionality including utilizing one or more interfaces 192 configured to for example, receive and respond to queries from users at computing devices 110; interface with inventory companies 140, manufacturers 150, sales data companies 160, financial institutions 170, DMVs 18, external sources 184 or dealers 130 to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, or almost any other type of interface which it is desired to utilize in a particular context.

In general, then, using these interfaces 192, vehicle data system 120 may obtain data from a variety of sources, including one or more of inventory companies 140, manufacturers 150, sales data companies 160, financial institutions 182, DMVs 180, external data sources 184 or dealers 130 and store such data in data store 122. This data may be then grouped, analyzed or otherwise processed by vehicle data system 120 to determine desired data 126 or models 128 which are also stored in data store 122. A user at computing device 110 may access the vehicle data system 120 through the provided interfaces 192 and specify certain parameters, such as a desired vehicle configuration. The vehicle data system 120 can select a particular set of data in the data store 122 based on the user specified parameters, process the set of data using processing module 196 and models 128, generate interfaces using interface module 192 using the selected data set and data determined from the processing, and present these interfaces to the user at the user's computing device 110. More specifically, in one embodiment interfaces 192 may visually present the selected data set to the user in a highly intuitive and useful manner.

In particular, in one embodiment, a visual interface may present at least a portion of the selected data set as a price curve, bar chart, histogram, etc. that reflects quantifiable prices or price ranges (e.g., "lower prices," "sale price," "market average price," "higher prices" etc.) relative to reference pricing data points or ranges (e.g., trade in price, list price, market low sale price, market average sale price, market high sale price, etc.). Using these types of visual presentations may enable a user to better understand the pricing data related to a specific vehicle configuration.

Turning to the various other entities in topology 100, dealer 130 may be a retail outlet for vehicles manufactured by one or more of OEMs 150 or may be used vehicle dealers. To track or otherwise manage sales, finance, parts, service, inventory and back office administration needs dealers 130 may employ a dealer management system (DMS) 132. Since many DMS 132 are Active Server Pages (ASP) based, transaction data 134 may be obtained directly from the DMS 132 with a "key" (for example, an ID and Password with set permissions within the DMS system 132) that enables data to be retrieved from the DMS system 132. Many dealers 130 may also have one or more web sites which may be accessed over network 170, where pricing data pertinent to the dealer 130 may be presented on those web sites, including any pre-determined, or upfront, pricing. This price is typically the "no haggle" (price with no negotiation) price and may be deemed a "fair" price by vehicle data system 120.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by the dealer to pull data from a DMS 132 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, Autotrader, FordVehicles.com).

DMVs 180 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes. Additionally, DMVs may maintain tax records of used vehicle transactions, inspection, mileages, etc.).

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from the DMS 132 systems of particular dealers 130. These companies may have formal agreements with dealers 130 that enable them to retrieve data from the dealer 130 in order to syndicate the collected data for the purposes of internal analysis or external purchase of the data by other data companies, dealers, and OEMs.

Manufacturers 150 are those entities which actually build the vehicles sold by dealers 130. In order to guide the pricing of their vehicles, the manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various source, online or otherwise, which may provide other types of desired data, for example data regarding vehicles, pricing, demographics, economic conditions, markets, locale(s), consumers, etc.

Thus, as can be seen, from the above data sources, vehicle data system 120 can obtain and store at least the following data sets (which may be stored, for example, as obtained data 124): (a) Used vehicle sale transactions: this dataset comprises the individual historical sales transactions, which includes the core information about the sale including the vehicle year, make, model, trim, identification, region, sale price, mileage, condition, options, etc.; (b) Used vehicle listing data: this dataset captures the historical as well as current listings available in the market, which includes vehicle year, make, model, trim, identification, region, listing price, mileage, condition, etc.; (c) Geography data: this dataset comprises mappings across zip code, city, state, region, DMA, etc.; (d) Demographic data: this dataset has demography information such as median household income, median house value at a geographic (e.g., zip code, city, state, region, DMA, etc.) level; (e) Vehicle data: this dataset comprises the vehicle information, such as vehicle year, make, model, trim, engine, transmission, drivetrain, body type, option, MSRP, invoice, etc.; (f) Vehicle residual value data: this data is published by an external data source (e.g., vehicle leasing or finance companies) and comprise estimates of the residual value of used vehicles; and (g) Title history data: this data is specific to individual vehicles such as number of owners, clean title or not, etc.

It should be noted here that not all of the various entities depicted in topology 100 are necessary, or even desired, in embodiments of the invention, and that certain of the functionality described with respect to the entities depicted in topology 100 may be combined into a single entity or eliminated altogether. Additionally, in some embodiments other data sources not shown in topology 100 may be utilized. Topology 100 is therefore exemplary only and should in no way be taken as imposing any limitations on embodiments of the invention.

Using the available data sets then, embodiments may accurately estimate sale price and listing price for a given used vehicle. Sale price is the amount the user paid to purchase the car or it is anticipated a user will pay to purchase a car; listing price refers to the price that the car was/is listed/advertised for on the market. Given both estimations, any owner who wants to sell his/her vehicle can do so with an accurate understanding of the market value of the car.

As discussed above, used car pricing is a more challenging problem compared to new car pricing for a variety of reasons, including considerations of condition, mileage, age, variety, sales velocity, configuration, etc. Embodiments as disclosed herein may account for substantially all these factors and allows us an accurate estimation of sale and listing prices for a given used car.

Figure 2:
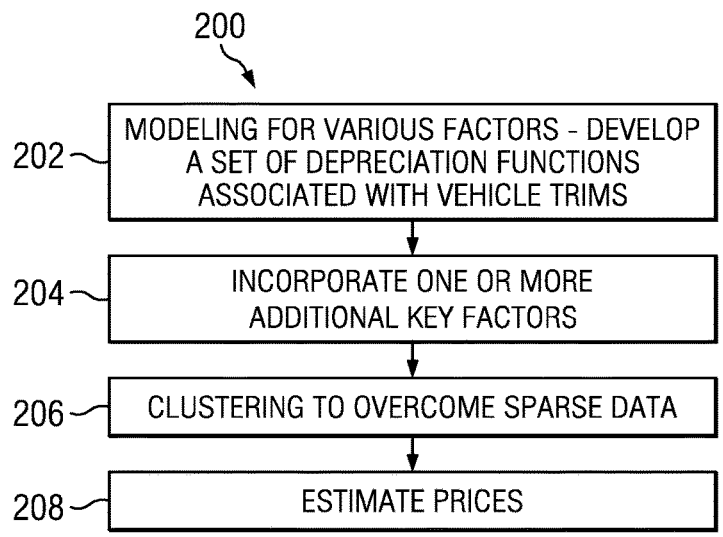
FIG. 2 depicts one embodiment of a method for determining and presenting pricing data.

In particular, turning now to FIG. 2, a high-level flow diagram 200 illustrating a method for modeling and determining used vehicle pricing data is shown. Initially, this regression model approach includes determining a set of depreciation functions associated with vehicle trims in order to facilitate estimation of a base value of the car (step 202). Additional key factors can then be incorporated into the regression models to estimate their individual impact or interactions (step 204). As will be explained in greater detail below, these factors may include (a) Mileage; (b) Condition; (c) Geographic information (region, state, ZIP code, metro, DMA, etc.); (d) Demographic information (household income, house value, etc.); (e) Vehicle attributes (transmission, engine, drivetrain, hybrid, electric, etc.); (f) Vehicle options; and (g) Days to sell.

The days to sell factor captures the market feature that for a given used car the expected price (e.g., sale price) varies depending on the time frame in which the owner wants to sell their vehicle. The days to sell factor may equal the number of days between the date when the vehicle is first listed on the market and the date when the vehicle is sold. Note that even for the exact same vehicle; it can be sold for different prices depending on the time frame in which the owner wants to sell their vehicle.

In addition to the above factors that are considered in the regression model(s), clustering approaches (step 206) may also applied to overcome sparse data caused, for example, by the drop in sales velocity or the static configuration of a used vehicle. The purpose of clustering is to identify similar vehicles and similar geographic regions so that data points can be pooled together for regression analysis.

Market-level prices can then be estimated to provide owners more insights (step 208). In one embodiment, the estimation can provide market low, average, and high prices. These prices are estimated based upon the relevant historical sales, a sale price regression analysis, and further adjustments to align with the specific configuration of owners' vehicles (e.g., provided by a user).

Figure 3:
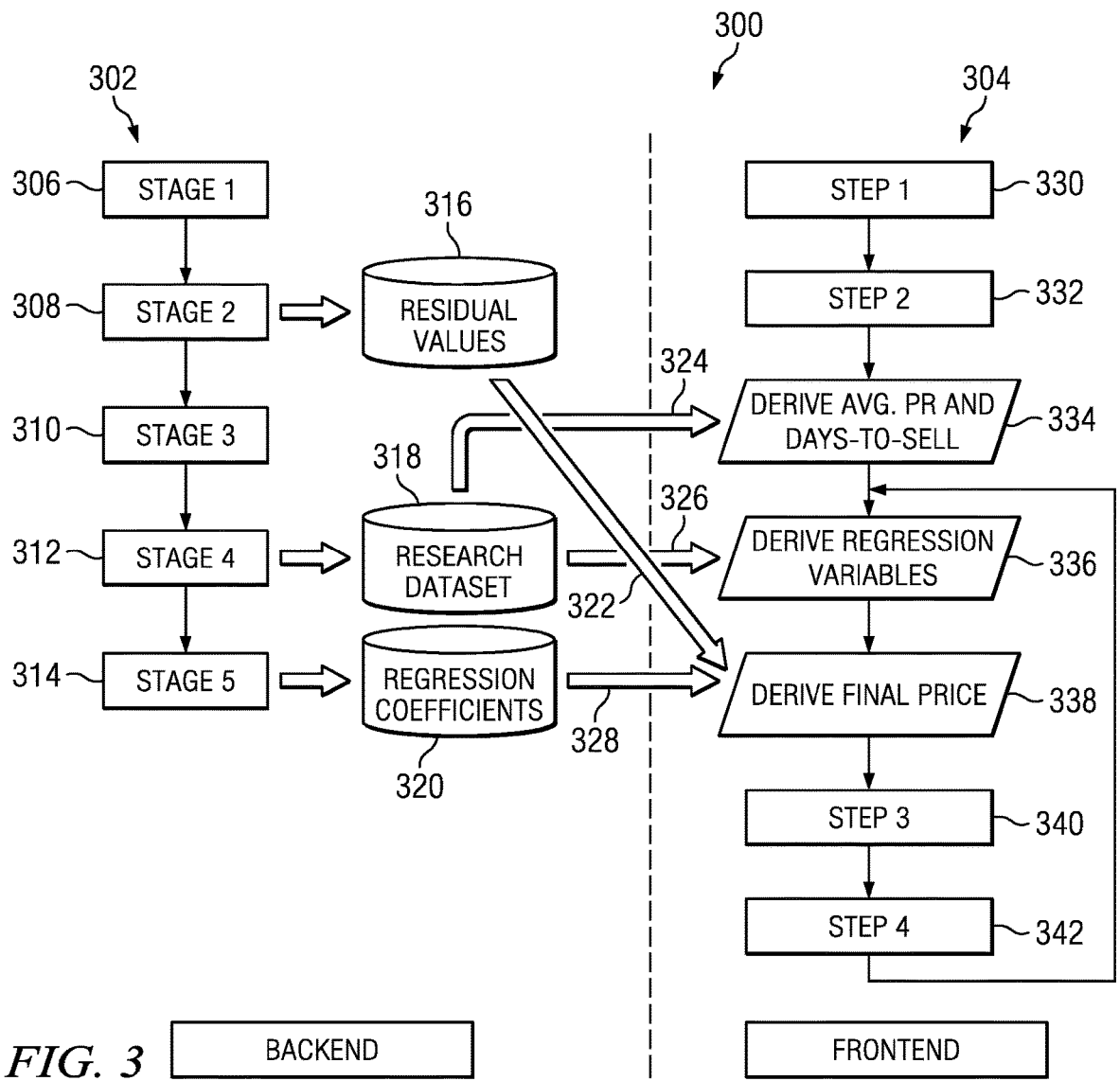
FIG. 3 depicts an embodiment of a method for determining and presenting pricing data.

Turning now, to FIG. 3, one embodiment of a method for the aggregation, analysis, and presentation of transaction and pricing data related to vehicles, including used vehicles, is presented in greater detail.

The process 302 may be divided into backend processing 302 and frontend processing 304. The backend processing 302 may entail the development of one or more models based upon historical transaction data. In certain embodiments, models may be constructed on one or more different levels. For example, a model may be built on a national level, a make level, a model level, a bin level, etc. Furthermore, there may be a set of models for each price which it is desired to determine. For example, there may be a set of models for list price, a set of model for sale price and a set of models for trade in price. Thus, for example, there may be a set of models for list price, each model corresponding to a bin; a set of models for sale price, each model corresponding to a bin and a set of models for trade-in price, each model corresponding to a bin.

The frontend processing 304 may utilize the model(s) developed in the backend processing to determine pricing data to present to the user. More specifically, during the frontend processing 304, a model associated with an anticipated price (e.g., sale price, list price, trade-in price) and the user-provided vehicle configuration may be determined. Values of the user-specified vehicle configuration (e.g., mileage, condition, etc.) may be used to calculate variables for the model and an anticipated price (e.g., sale price, list price, trade-in price) determined.

Referring first to the embodiment of the backend processing 302 depicted in FIG. 3, these steps may be utilized in conjunction with the historical transaction data to create a set of models. It will be noted that all, or a subset, of these steps may be repeated for each model it is desired to determine.

In Stage 1 (306), a Baseline Valuation is determined. In order to accurately estimate the sale price or listing price for a given used vehicle (or bin), a first step may be to develop a reliable Depreciation Function for vehicle base value. This may be accomplished using the historical transaction data associated with the vehicle or bin.

Figures 4, 5:
FIG. 4 depicts an exemplary bin for use in determining and presenting pricing data.
FIG. 5 depicts exemplary historical data for an average price determination.

As noted above, the bin is the group of vehicles in the historical transactions that are of the same make, model, body type, same year (or generation), similar time frame, or similar geography. Exemplary bins are shown in FIG. 4. In the example illustrated, the bin is defined in terms of Year, Make, Model, and ZIP Code. In some embodiments, ZIP Code refers to a center of a geographic region (e.g., on the order of tens or hundreds of miles). The actual region could be larger than a single ZIP code. In the example illustrated, Bin 1 thus comprises Year 2009, Make Honda, Model Civic, and ZIP Code 90401. Bin 2 comprises Year 2005, Make Toyota, Model Camry, and ZIP Code 78701.

A Depreciation Value may be defined as the decline in value of a vehicle that is no longer considered "New." A Depreciation Function may be defined as a mathematical/statistical formula that will output a current value of the vehicle, given age, mileage, condition, and geography relative to the vehicle's value when "New." Plugging in different age, mileage, condition, and geography parameters will result in an exponential decay function that models the Depreciation Value of a given vehicle.

In order to produce a Depreciation Value for a vehicle, the following data may be accounted for (i) Vehicle Configuration: Year, Make, Model, Trim, Standard Features, manufacturer installed options, and dealer installed options; (ii) Depreciated Valuation Source: such as Lease Residual Values or Dealer Residual Values (Lease Residual Values and Dealer Residual Values are the value of the vehicle after expiration of a lease or on trade-in, respectively); (iii) MSRP and Invoice price; and (iv) Historical transaction data that covers used car sales across all of the United States.

The Baseline Valuation calculation leverages a depreciated valuation source, such as lease residual values, as a response variable on which to construct a Depreciation Function that may be used for a specific vehicle.

The first step in coming up with a Depreciation Function that is tailored for a specific vehicle may be to build a generalized Exponential Decay curve that models the Depreciation Value of the vehicle given different age inputs. This is done by fitting an exponential decay curve to a depreciated valuation, and the result is a function in the form of:

$$Y = \beta e^{-\delta t} \qquad \text{(Eq. 1)}$$

where $\beta$ and $\delta$ are estimates from a non-linear fit regression model that has the functional form of the equation above, where the dependent variable, Y, is the natural log of the vehicle's residual value as defined by sources that set residual values. It is defined as vehicle age, computed as Today's Year less the Model Year of the vehicle.

In one embodiment, the following principles may also apply to the dependent variable Y:

The structure can be decomposed additively into a mean function and an error component.

The model errors are uncorrelated and have zero mean.

The mean function consists of known regressor variables and unknown constants (β and δ)

Thus, from this exercise, we have a prediction of the form:

$$\hat{Y} = \beta e^{-\delta t} \quad (\text{Eq. 2})$$

Where $\hat{Y}$ is the natural log of a predicted residual value, which can be transformed into a predicted current baseline valuation. In particular, the Baseline Valuation would be the product of the MSRP with the anti-log of $\hat{Y}$.

Stage 2 (308): Residual Valuation

Next, in Stage 2 (308), the transaction residual values of vehicles may be modeled as a function of (1) the Exponential Decay estimate, (2) mileage, (3) condition, and (4) geography. A Linear Regression may be used to generate estimates for the possible parameters. The dependent variable is the vehicle's baseline valuation divided by the Vehicle's MSRP Value as new. The resulting formula for Residual Value is a linear function that is of the form:

$$Y = \beta_0 + \Sigma \beta_i X_i + \varepsilon \quad (\text{Eq. 3})$$

where Y is the baseline valuation/MSRP at transactional level, the betas are the parameters that have been estimated, and the Xi's are the values for the predicted residual value (from Stage 1 (306) above), mileage, condition (which can be input as indicator variables or ordinal values), and geography (which can be input as indicator variables). This formula can then be used to obtain an accurate Residual Value of any vehicle, with any mileage, condition, and geographical location. This is done by applying the Depreciation Function to the vehicle value as "New." The result is stored (316) and, as will be explained in greater detail below, may be used by the Frontend 304 to derive the final price.

Stage 3 (310). Clustering of Vehicles and Geographic Regions

In some embodiments, it may be the case that the historical models might not have enough coverage across all the geographic regions. It may be important then to estimate the prices for these sparse models based on the most similar models. This may be achieved by clustering the most similar vehicle models based on the vehicle and geography. Here the similarities of models can be defined with make, body type, vehicle type (truck, SUV, coupe, convertible, etc.), engine, transmission, etc. Also, given the depreciation functions developed (as described above), the clustering process may be supervised by the normalized prices (as divided by residual value) instead of the actual prices. A final bin for a specific vehicle will be referred to herein as q. In addition, as will be discussed in greater detail below, the residual values 316 may be used by the frontend 304 to derive the final price.

Stage 4 (312). Construction of Research Dataset

After classifying transactions data into clusters of vehicles having similar characteristics, research datasets 318 may be constructed for the vehicle pricing. In some embodiments, the research datasets are constructed using the following operations:

Use of temporally-weighted historical data to generate a sufficient number of observations needed to draw inferences with acceptable confidence;

Use of geo-specific socioeconomic variables to account for geographic differences in consumer behavior (e.g., median income, median home prices); and Vehicle-specific attributes (e.g., engine type, drive type).

4.1 Temporal Weighting of Historical Observations

Every historical transaction, $y_t$, can be used in the modeling process. However, use of a transaction that occurred in the very distant past may cause misleading results, particularly if the used-car market has witnessed recent changes such as the price jump due to supply interruptions caused by natural disasters or seasonal fluctuations. To put emphasis on more recent transactions and thereby more quickly capture change, a temporal weight is assigned to each observation based on its age in weeks. The approach used is an exponentially weighted moving average:

$$S_t = \alpha Y_{t-1} + (1-\alpha) S_{t-1} \quad (\text{Eq. 4})$$

Above, $S_t$ represents the exponentially weighted moving average in week t, α is a parameter controlling how quickly historical transactions are discounted and $Y_{t-1}$ is price of transactions occurring in week t−1.

It may be important to choose the appropriate value of a. An analysis of historical performance can be used to aid in the selection of the appropriate value. In the event where there are many transactions observed, say, in the last four (4) weeks, an unweighted average of these transactions can be used as it may provide a timely and robust measure or prices without relying upon historical data.

4.2 Geo-Specific Socioeconomic Data

Because consumer demand may vary with geography based on the characteristics and taste of the local population, a set of variables z may be used. These variables may include, for example, geo-specific information obtained from data providers and the US Census Bureau (based on the most recent decennial census): 1) fraction of rural households in the locality compared to national percentage, 2) median home price in the locality compared to the national median home price, 3) percentage of work force participation in locality compared to national work force participation and, using another data source with the locations of all US car dealers 4) the number of vehicle dealerships for a specific make in the locality.

4.3 Vehicle-Specific Attributes

To account for structural and pricing differences in each vehicle, a set of variables x may be considered. These variables may include: 1) the natural logarithm of the MSRP of the base vehicle without options, 2) natural logarithm of the ratio of MSRP of the vehicle with options and the base vehicle, 3) the vehicle body type (SUV, Van, Truck, Sedan, Coupe, Convertible), 4) fuel type (electric, diesel, hybrid, gasoline), 5) transmission type (automatic, manual), 6) drive type (4-wheel drive, front-wheel drive, rear-wheel drive) and 7) the number of cylinders in the vehicle's engine.

4.4 Usage/Maintenance of Vehicle

To account for the usage and maintenance of each vehicle, a set of variables y may be considered. These variables may include: 1) mileage on the vehicle, 2) condition of the vehicle; 3) title history. Title history is specific to individual vehicles. It indicates whether the vehicle has been properly maintained. This also helps estimate the actual condition of the vehicle.

4.5 Days-to-Sell

The number of days to sell a vehicle is an important factor on the listing price and the price at which the car is sold eventually. To observe the historical days to sell, the listings and transactions data may be merged to get the day a listing was added and the actual date the vehicle was sold. Then the number of days to sell can be derived. Note that even for the exact same vehicle, it can be sold for different prices depending how soon the owner wants to sell. If the owner trades in the vehicle which is likely to be lower price, then it is only matter of days. In addition, listing price will affect the number of interested buyers thus the days to sell as well.

Stage 5 (314). Offline Regression Model

Here, a model is built for the normalized price ratio (pr) defined as $$pr = \frac{price}{depreciated\ value}$$

relative to its weighted mean value of similar vehicles and regions. This work can be summarized by the equation:

$$pr_i - \overline{pr_q} = \alpha_o + \alpha_m + \Sigma_j \beta_j \cdot x_i + \Sigma_k \delta_k \cdot y_k + \Sigma_l \lambda_l \cdot z_l + \Sigma_n \theta_n \cdot v_n + \varepsilon_i \quad \text{(Eq. 5)}$$

Which can be rewritten in the more familiar form as:

$$pr_i = \overline{pr_q} + \alpha_o + \alpha_m + \Sigma_j \beta_j \cdot x_i + \Sigma_k \delta_k \cdot y_k + \Sigma_l \lambda_l \cdot Z_l + \Sigma_n \theta_n \cdot v_n + \varepsilon_i \quad \text{(Eq. 6)}$$

Where $$\overline{pr_q} = \left( \frac{\sum_{i \in q} w_i m r_i}{\sum_{i \in q} w_i} \right) \quad \text{(Eq. 7)}$$

In the preceding equation, the features in set x represent the set of regression variables which impact the price ratio such as vehicle attributes, the set y represents the usage/maintenance data, and the set z represents local-level customer and demographic information as well as industry-level data, the set v represents the days-to-sell data, $\alpha_o$ is a global intercept term, $\alpha_m$ is a make-level intercept applied only when i∈m, and $\overline{pr_q}$ denotes a weighted average of the price ratios for the particular bin q. $\varepsilon_i$ is the error term.

The model can be fitted using weighted Ordinary Least Squares (OLS) to find the regression coefficients (i.e., the estimated parameters $\hat{\alpha}, \hat{\beta}, \hat{\delta}, \hat{\lambda}, \hat{\theta}$ that result in the smallest sum of temporally weighted squared residuals). The results are then stored (320) for use in deriving the final price in the frontend, as will be discussed in greater detail below.

Given the results of the regression equation, the predicted price ratio of a vehicle i in a bin q is then $\hat{pr_i} = \hat{pr_i} + \overline{pr_q}$, where $\hat{pr_i}$ is the predicated price ratio that results from the model. The pr hat can be thought of as an estimate of how a vehicle differs from the average (pr bar).

The final estimated price for vehicle in transaction i is then $$\widehat{price}_i = \hat{pr_i} \times depreciated\ value_i. \quad \text{(Eq. 8)}$$

Note that in some embodiments, the regression step is gone through multiple times where price is changed to meet desired needs. Specifically, for a projection on recommended list price, list price data can be used as the dependent variable to predict list prices. If sale price is the goal, the process can be accomplished in the same fashion with list price as the dependent variable, which then provides us with a projection for recommended sale price.

All of the above describes the construction of the linear regression models in the backend (302). Thus, using the data determined in the backend processes, the user may obtain pricing data for a specified vehicle as depicted in the frontend processing (304) of FIG. 3.

Figure 6:
FIG. 6 depicts one embodiment of an interface.

In a Step 1 (330), a User selects the vehicle year, make, model, and trim. The user also may provide the zip code to estimate the price in. An embodiment of an interface which may be presented to a user to allow him to provide such data is depicted in FIG. 6.

In Step 2 (332), the User may select the vehicle condition, engine, transmission, drivetrain, and options subject to the selected vehicle trim; the use may also enter the mileage on the vehicle. An embodiment of an interface which may be presented to a user to allow him to provide such data is depicted in FIG. 7.

After the user selects the vehicle and mileage and condition, then pricing data to display to the user is algorithmically determined using models (as discussed above), including for example, list, sale, or trade-in pricing.

Thus, through steps 1 and 2, the user has described a specific vehicle. Based on the data provided by the user, values for the variables in the pricing equation may be filled in. Note that the parameters have been defined by the initial process of leveraging the obtained data to fit the models and set those coefficients in the backend processing, as described above.

Thus, a series of calculations happen right after step 2 (332) in order to present pricing data. The calculations may be done using a model determined in the backend processing as described above.

A bin q may be determined based on user input from steps 1 and 2.

All historical transactions may be pulled together from the same bin q as the user-selected vehicle in order to calculate the average price ratio (334). An example of the pricing data for a particular vehicle is shown in the table of FIG. 5. For example, if the user input information for a 2009 Honda Civic LX in the 90401 zip code, as well as additional information described above, the result would be to pull the listing of vehicles by Year, Make, Model, Trim, zip code, and price (pr). In the example illustrated, the bin is defined at the "Model" level rather than the trim level. Thus, historical data under other trims within the same model may be used. The pricing data for individual cars (pr) may be used to determine an average price.

Vehicle attributes may be collected for the user-selected vehicle and corresponding set of regression variables x are derived (336).

Based upon the user-entered mileage and condition, all relevant set of regression variables y may be calculated (336).

Local-level customer and demographic information may be collected based upon user-entered zip code and all relevant set of regression variables z may be derived (336).

Average days-to-sell may be calculated from historical transactions as a default value on the price report and the set of regression variables v can be calculated for the model (334).

The regression coefficients $\hat{\alpha}, \hat{\beta}, \hat{\delta}, \hat{\lambda}, \hat{\theta}$ which may have been pre-calculated (320), may be plugged into the regression variable sets x, y, z, v (as well as the average price ratio), and an expected price ratio may be obtained: $\hat{pr_i} = \hat{pr_i} + \overline{pr_q}$. A residual or depreciated value using the user-input data may be calculated based upon the decay curve and depreciation function that has been developed.

Figure 8:
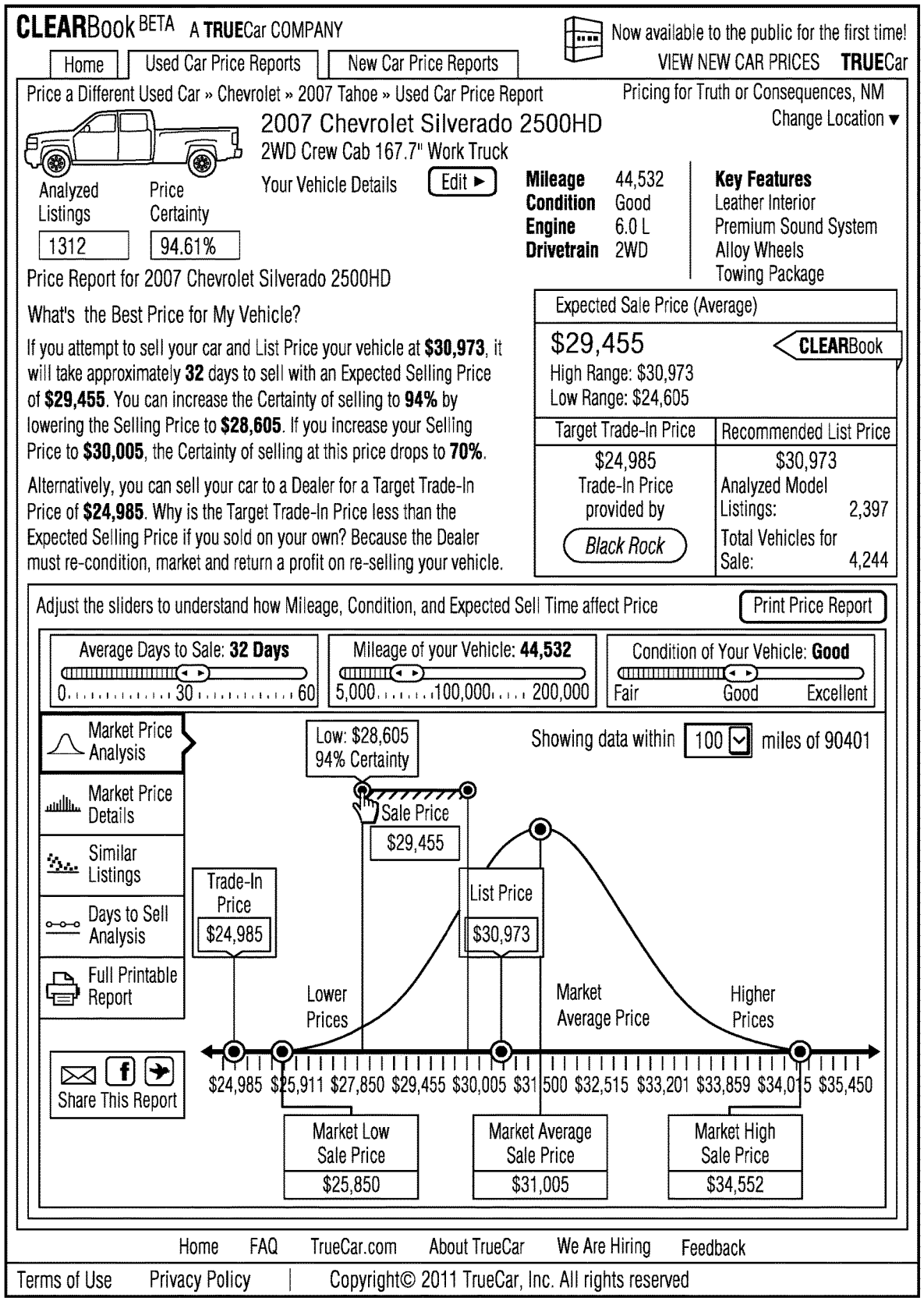
FIG. 8 depicts one embodiment of an interface.

Given the depreciated value calculated above, the expected price (338) can be obtained: $\widehat{price}_i = \hat{pr_i} \times depreciated\ value_i$ In Step 3 (340), the determined pricing data can then be presented to a user. A user thus accesses a price report where pricing data including expected sale price and list price are presented. An embodiment of an interface which may be presented to a user with such pricing data is depicted in FIG. 8.

In Step 4 (342), on the presented interface (FIGS. 6-8), the user may have the ability to enter additional frontend information to modify calculations further. Specifically, in some embodiments, the user can enter changes to the vehicle condition, mileage, and the anticipated days to sell. With changes to these selected elements, specific frontend algorithmic adjustments may be made and presented to the user through the interface.

Figure 9:
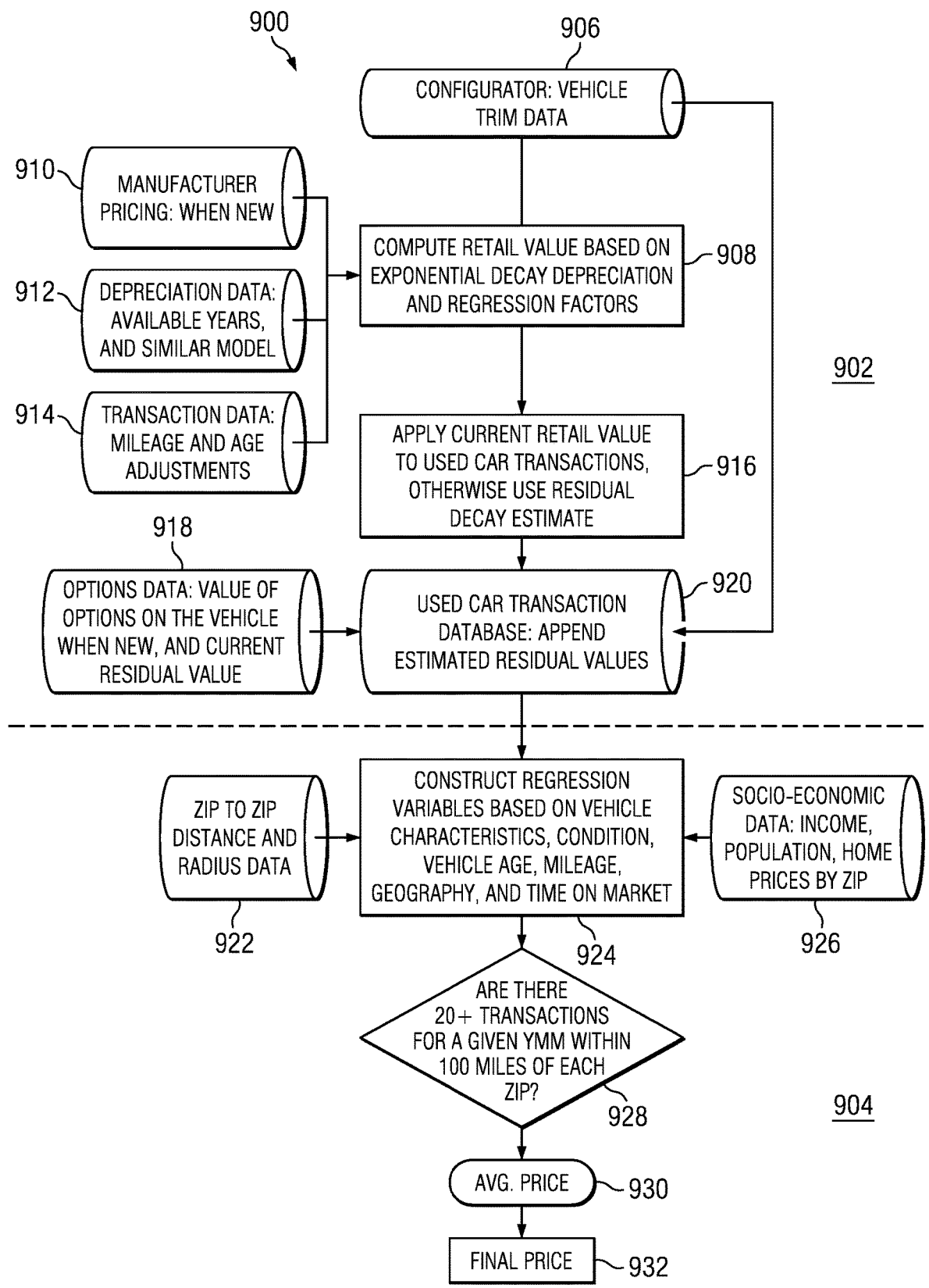
FIG. 9 depicts an embodiment of a method for determining and presenting pricing data.

An example embodiment of a pricing system is shown in greater detail in the flowchart 900 of FIG. 9. More particularly, shown are operations implemented at frontend 902 and backend 904.

The backend process 902 may receive as inputs configuration data (e.g., vehicle trim data) (906), as well as manufacturer pricing (910), depreciation data (912) and transaction data (mileage and age adjustments) (914). This data may be available from a variety of outside vendors or public sources and may be available as commercial or public databases. In some embodiments, the vehicle trim data may comprise vehicle trim data for vehicles over a predetermined period, such as for the past twenty years.

These inputs may be used to compute the retail value based on the exponential decay depreciation and regression factors discussed above (908), corresponding to Stage 2 and Stage 3 of FIG. 3. In some embodiments, the resulting residual decay estimates may be applied to the used car transaction(s) (corresponding to Stage 4 of FIG. 3), although in other implementations, actual retail value data may be used (916). This process focuses on the frontend logic, whereas the regression coefficients are already derived from backend.

In either case, the residual values, as well as the manufacturer configuration data (906), are added to the used car transaction database (920), i.e., the research dataset (318, FIG. 3). In addition, options data may be provided (step 918) to the used car transaction database. Options data corresponds to the value of the options on the vehicle when new and the current residual value.

The backend processing 902, and updating of the regression coefficients, may occur on a regular basis, such as a daily or weekly basis.

As noted above, the frontend processing 904 is run in response to user input data about his or her automobile and other information, such as zip to zip distance and radius data (922), and socio-economic data, such as income, population, home prices by zip code, etc. (926). User input can include, for example, vehicle characteristics, mileage, condition, age, geography, and time on market. Regression variables may then be constructed based on these inputs (924). As noted above, such inputs can be received via a user interface, such as those of FIGS. 6-8.

At step 928, the system may determine if there are sufficient transactions for a given YMM (year, make, model) within a particular distance of the zip code For example, in some embodiments, a base of 100 miles of each zip code are used.

If so, then an average price may be determined as described above (930). The final price maybe derived based on the regression variables, the regression coefficients, and the research dataset (932). In some embodiments, the individual transaction price ratio may be normalized against a corresponding local price ratio of vehicles within the predetermined radius. In other embodiments, a national price ratio may be used.

Embodiments disclosed herein may be implemented in or in conjunction with embodiments disclosed in commonly-assigned, U.S. patent application Ser. No. 12/556,076, filed Sep. 9, 2009, issued as U.S. Pat. No. 9,129,325, and entitled "SYSTEM AND METHOD FOR AGGREGATION, ANALYSIS, PRESENTATION AND MONETIZATION OF PRICING DATA FOR VEHICLES AND OTHER COMMODITIES," which is hereby incorporated by reference in its entirety. It should be noted that the embodiments depicted therein may be used in association with specific embodiments and any language used to describe such embodiments, including any language that may be in any way construed as restrictive or limiting (e.g., must, needed, required, etc.) should only be construed as applying to that, or those, particular embodiments.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A computer-implemented method of used vehicle data processing, the method comprising:

receiving, from disparate data sources over a network by a backend process as inputs, vehicle trim data on vehicles over a past time period, vehicle manufacturer data on the vehicles when new, depreciation data on the vehicles or similar vehicle models, and vehicle transaction data on the vehicles, the backend process executing on a processor of a vehicle data system, the vehicle data system having a server computer that provides a web site or web service on Internet;

computing, by the backend process, current retail values of the vehicles using a linear function, the computing comprising generating estimates for parameters of the linear function;

determining, by the backend process, residual values of the vehicles utilizing the current retail values of the vehicles and the vehicle transaction data on the vehicles;

appending, by the backend process, a used vehicle research dataset with the residual values of the vehicles;

updating, by the backend process, the estimates for the parameters of the linear function at a time interval;

receiving, by the server computer through the web site or web service on the Internet, user input data comprising a zip code and vehicle year, make, model, trim, condition, and mileage of a used vehicle;

responsive to the user input data, constructing, by a frontend process based on the user input data, sets of regression variables including a set of regression variables constructed based on vehicle attributes of the used vehicle, a set of regression variables constructed based on the condition and mileage of the used vehicle, and a set of regression variables constructed based on the zip code, the frontend process operated by the vehicle data system;

determining, by the frontend process using the zip code and the vehicle year, make, and model of the used vehicle, a set of vehicles in a bin from the used vehicle research dataset, wherein each vehicle of the set of vehicles in the bin has same vehicle year, make, and model as the used vehicle and wherein each vehicle of the set of vehicles in the bin is in a geographic region inclusive of the zip code of the used vehicle;

determining, by the frontend process using residual values of the set of vehicles in the bin from the used vehicle research dataset, an average price for the used vehicle;

determining, by the frontend process using the sets of regression variables constructed by the frontend process and the estimates for the parameters updated by the backend process, a depreciated value of the used vehicle;

determining, by the frontend process using the average price for the used vehicle and the depreciated value of the used vehicle, an expected price of the used vehicle in the zip code; and presenting the expected price of the used vehicle in the zip code on a user device over the Internet.

2. The computer-implemented method according to claim 1, wherein the presenting comprises presenting the expected price of the used vehicle in the zip code within a range of prices.

3. The computer-implemented method according to claim 1, wherein the expected price of the used vehicle in the zip code is associated with a number of average days to sale such that the expected price of the used vehicle in the zip code and the number of average days to sale are interdependent.

4. The computer-implemented method according to claim 3, further comprising:

presenting a user interface element on the user device for adjusting the number of average days to sale.

5. The computer-implemented method according to claim 4, further comprising:

receiving, by the frontend process from the user device, an adjustment to the number of average days to sale through the user interface element; and in response to the adjustment to the number of average days to sale, adjusting, by the frontend process, the expected price of the used vehicle in the zip code presented on the user device.

6. The computer-implemented method according to claim 1, wherein the expected price of the used vehicle in the zip code determined by the frontend process comprises a listing price of the used vehicle in the zip code, a sale price of the used vehicle in the zip code, or a trade-in price of the used vehicle in the zip code.

7. The computer-implemented method according to claim 1, further comprising:

prior to determining the bin containing the set of vehicles from the used vehicle research dataset, determining, by the backend process, whether sufficient transactions for the vehicle year, make, model of the used vehicle within a distance of the zip code exist in the used vehicle research dataset; and responsive to insufficient transactions for the vehicle year, make, model of the used vehicle within the distance of the zip code in the used vehicle research dataset, performing, by the backend process, a clustering process to include in the bin additional historical transactions involving vehicle models in the used vehicle research dataset that are most similar to the used vehicle in the zip code.

8. A vehicle data system for used vehicle data processing, the vehicle data system comprising:

a server computer that provides a web site or web service on Internet, the server computer having a processor and a non-transitory computer-readable medium storing instructions translatable by the processor for:

operating a backend process, comprising:

receiving, from disparate data sources over a network as inputs, vehicle trim data on vehicles over a past time period, vehicle manufacturer data on the vehicles when new, depreciation data on the vehicles or similar vehicle models, and vehicle transaction data on the vehicles;

computing current retail values of the vehicles using a linear function, the computing comprising generating estimates for parameters of the linear function;

determining residual values of the vehicles utilizing the current retail values of the vehicles and the vehicle transaction data on the vehicles;

appending a used vehicle research dataset with the residual values of the vehicles; and updating the estimates for the parameters of the linear function at a time interval;

receiving, through the web site or web service on the Internet, user input data comprising a zip code and vehicle year, make, model, trim, condition, and mileage of a used vehicle; and operating a frontend process comprising:

responsive to the user input data, constructing, based on the user input data, sets of regression variables including a set of regression variables constructed based on vehicle attributes of the used vehicle, a set of regression variables constructed based on the condition and mileage of the used vehicle, and a set of regression variables constructed based on the zip code, the frontend process operated by the vehicle data system;

determining, using the zip code and the vehicle year, make, and model of the used vehicle, a set of vehicles in a bin from the used vehicle research dataset, wherein each vehicle of the set of vehicles in the bin has same vehicle year, make, and model as the used vehicle and wherein each vehicle of the set of vehicles in the bin is in a geographic region inclusive of the zip code of the used vehicle;

determining, using residual values of the set of vehicles in the bin from the used vehicle research dataset, an average price for the used vehicle;

determining, using the sets of regression variables constructed by the frontend process and the estimates for the parameters updated by the backend process, a depreciated value of the used vehicle;

determining, using the average price for the used vehicle and the depreciated value of the used vehicle, an expected price of the used vehicle in the zip code; and presenting the expected price of the used vehicle in the zip code on a user device over the Internet.

9. The vehicle data system of claim 8, wherein the presenting comprises presenting the expected price of the used vehicle in the zip code within a range of prices.

10. The vehicle data system of claim 8, wherein the expected price of the used vehicle in the zip code is associated with a number of average days to sale such that the expected price of the used vehicle in the zip code and the number of average days to sale are interdependent.

11. The vehicle data system of claim 8, wherein the frontend process further comprises:

presenting a user interface element on the user device for adjusting the number of average days to sale.

12. The vehicle data system of claim 11, wherein the frontend process further comprises:

receiving, from the user device, an adjustment to the number of average days to sale through the user interface element; and in response to the adjustment to the number of average days to sale, adjusting the expected price of the used vehicle in the zip code presented on the user device.

13. The vehicle data system of claim 8, wherein the expected price of the used vehicle in the zip code determined by the frontend process comprises a listing price of the used vehicle in the zip code, a sale price of the used vehicle in the zip code, or a trade-in price of the used vehicle in the zip code.

14. The vehicle data system of claim 8, wherein the backend process further comprises:

prior to determining the bin containing the set of vehicles from the used vehicle research dataset, determining whether sufficient transactions for the vehicle year, make, model of the used vehicle within a distance of the zip code exist in the used vehicle research dataset; and responsive to insufficient transactions for the vehicle year, make, model of the used vehicle within the distance of the zip code in the used vehicle research dataset, performing a clustering process to include in the bin additional historical transactions involving vehicle models in the used vehicle research dataset that are most similar to the used vehicle in the zip code.

15. A computer program product for used vehicle data processing, the computer program product comprising a non-transitory computer-readable medium storing instructions translatable by a server computer that provides a web site or web service on Internet, the instructions when translated by the server computer perform:

operating a backend process, comprising:

receiving, from disparate data sources over a network as inputs, vehicle trim data on vehicles over a past time period, vehicle manufacturer data on the vehicles when new, depreciation data on the vehicles or similar vehicle models, and vehicle transaction data on the vehicles;

computing current retail values of the vehicles using a linear function, the computing comprising generating estimates for parameters of the linear function;

determining residual values of the vehicles utilizing the current retail values of the vehicles and the vehicle transaction data on the vehicles;

appending a used vehicle research dataset with the residual values of the vehicles; and updating the estimates for the parameters of the linear function at a time interval;

receiving, through the web site or web service on the Internet, user input data comprising a zip code and vehicle year, make, model, trim, condition, and mileage of a used vehicle; and operating a frontend process comprising:

responsive to the user input data, constructing, based on the user input data, sets of regression variables including a set of regression variables constructed based on vehicle attributes of the used vehicle, a set of regression variables constructed based on the condition and mileage of the used vehicle, and a set of regression variables constructed based on the zip code, the frontend process operated by the vehicle data system;

determining, using the zip code and the vehicle year, make, and model of the used vehicle, a set of vehicles in a bin from the used vehicle research dataset, wherein each vehicle of the set of vehicles in the bin has same vehicle year, make, and model as the used vehicle and wherein each vehicle of the set of vehicles in the bin is in a geographic region inclusive of the zip code of the used vehicle;

determining, using residual values of the set of vehicles in the bin from the used vehicle research dataset, an average price for the used vehicle;

determining, using the sets of regression variables constructed by the frontend process and the estimates for the parameters updated by the backend process, a depreciated value of the used vehicle;

determining, using the average price for the used vehicle and the depreciated value of the used vehicle, an expected price of the used vehicle in the zip code; and presenting the expected price of the used vehicle in the zip code on a user device over the Internet.

16. The computer program product of claim 15, wherein the presenting comprises presenting the expected price of the used vehicle in the zip code within a range of prices.

17. The computer program product of claim 15, wherein the expected price of the used vehicle in the zip code is associated with a number of average days to sale such that the expected price of the used vehicle in the zip code and the number of average days to sale are interdependent.

18. The computer program product of claim 15, wherein the frontend process further comprises:

presenting a user interface element on the user device for adjusting the number of average days to sale.

19. The computer program product of claim 18, wherein the frontend process further comprises:

receiving, from the user device, an adjustment to the number of average days to sale through the user interface element; and in response to the adjustment to the number of average days to sale, adjusting the expected price of the used vehicle in the zip code presented on the user device.

20. The computer program product of claim 15, wherein the backend process further comprises:

prior to determining the bin containing the set of vehicles from the used vehicle research dataset, determining whether sufficient transactions for the vehicle year, make, model of the used vehicle within a distance of the zip code exist in the used vehicle research dataset; and responsive to insufficient transactions for the vehicle year, make, model of the used vehicle within the distance of the zip code in the used vehicle research dataset, performing a clustering process to include in the bin additional historical transactions involving vehicle models in the used vehicle research dataset that are most similar to the used vehicle in the zip code.

\* \* \* \* \*